(12) United States Patent
Ueno et al.

(10) Patent No.: US 6,581,051 B1
(45) Date of Patent: Jun. 17, 2003

(54) AGENT PRESENTATION APPARATUS

(75) Inventors: Tsuyoshi Ueno, Tokyo (JP); Yoshihiro Noguchi, Chiba (JP); Hideki Yasukawa, Tokyo (JP); Masaki Hoshida, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/479,335

(22) Filed: Jan. 7, 2000

(30) Foreign Application Priority Data

Jan. 11, 1999 (JP) .......................................... 11-003618

(51) Int. Cl.[7] ............................................. G06F 17/00
(52) U.S. Cl. ........................................... 706/47; 706/46
(58) Field of Search ..................................... 706/47, 46

(56) References Cited

U.S. PATENT DOCUMENTS 5,727,950 A  *  3/1998  Cook et al. ................. 434/350
5,760,771 A     6/1998  Blonder et al. ............. 345/854
6,246,758 B1 *  6/2001  Low et al. ................... 379/230

FOREIGN PATENT DOCUMENTS

| JP | 5-143346 | 6/1993 |
| JP | 9-311869 | 2/1997 |
| JP | 10-11292 | 1/1998 |
| JP | 6-51935 | 2/1999 |

* cited by examiner

Primary Examiner—George B. Davis
(74) Attorney, Agent, or Firm—Pearne & Gordon LLP

(57) ABSTRACT

An agent presentation apparatus for transmitting and receiving a message and operating based on a knowledge base and a rule base. In particular, where an agent for carrying out a user request uses knowledge of a knowledge description or an action description between agents and executes communication, for example. An agent can request a WWW page locally or remotely over a network to retrieve already existing contents and make a presentation that might include one or more of images, voice, and text along with the WWW page. The apparatus can also respond to user questions about the WWW page using the knowledge description and/or the action description, for example.

16 Claims, 33 Drawing Sheets

FIG. 2

```
agentscript>
    id>agent1<id
    knowledge>
   <knowledge
    rule>
      action([_,do,_,presentation,_,_,],(
            act(image1,"EXPLANATION AGENT",sound1,http://a1),
            act(image2,"CONFERENCE CAN BE ADJUSTED",sound2,file://a2),
            act(image3,"SEE YOU AGAIN!",sound3,http://a3)
      ),ok),
      action([_,teach,_,price,_,_],(
            act(image5,"FREE",sound5,http://a5),
      ),ok)
      action([_,report,_,Pages,_,_,],(
            for_each(Pages,Page,
                  (
                  act(image5,
         "IS THERE AN ANSWER TO THE QUESTION?",sound5,Page),
                        if(got_answer(ok))
                                    learn(action([_,What,Whose,Whom,When,Where],
                                          act(image5,"ANSWER",sound5,Page)
                                    )
                              )
                        )
                  ),
      ),ok)
      action([_,answer,is,ok,_,_,],(
            learn(got_answer(ok)),
      ),ok)
    <rule
    message>
       input_message(text)
       text="ask(Sender,Me,Order)"->
            test(action(Order,_,Response)),
            tell(Me,Sender,Response)
       text="ask(Sender,Me,[_,What,Whose,Whom,When,Where])"->
            search(http://search_engine.p]
                        Keyword=What+Whose+Whom+When+Where,Pages),
            test(action([_,report,_,Pages,_,_],_,Response)),
            tell(Me,Sender,Response)
       test=?->
            act(image4,"I CANNOT REPLY TO THE QUESTION",sound4,http://a4)
    <message
<agentscript
```

FIG. 5

```
agentscript>
    id>agent1<id
    knowledge>
    <knowledge
    rule>
        action([_,do,_,presentation,now,_],(
            act(image6,"CURRENT WEATHER FORECAST",sound6,http://b1),
            act(image7,"TYPHOON IS APPROACHING",sound7,file://b2),
            act(image8,"SEE YOU AGAIN!",sound8,http://b3),
        ),ok),
    <rule
    message>
        input_message(text)
        text="ask(Sender,Me,Order)"->
            test(action(Order,_,Response)),
            tell(Me,Sender,Response)
        text=?->
            act(image4,"I CANNOT REPLY TO THE QUESTION",sound4,http://a4)
    <message
<agentscript
```

FIG. 6

```
agentscript>
    id>agent1<id
    knowledge>
    <knowledge
    rule>
        action([_,do,_,presentation,16:00,_],(
            act(image6,"MUSIC PROGRAM",sound9,http://c1),
            act(image7,"PIECE OF MUSIC OF BACH",sound10,file://c2),
            act(image8,"SEE YOU AGAIN!",sound11,http://c3),
        ),ok),
    <rule
    message>
        input_message(text)
        text="ask(Sender,Me,Order)"->
            test(action(Order,_,Response)),
            tell(Me,Sender,Response)
        text=?->
            act(image4,"I CANNOT REPLY TO THE QUESTION",sound4,http://a4)
    <message
<agentscript
```

FIG. 7

```
agentscript>
    id>agent1<id
    knowledge>
    <knowledge
    rule>
        action([_,do,_,presentation,no_user_input,_],(
            act(image6,"ART PROGRAM",sound12,http://d1),
            act(image7,"WORK OF PICASSO",sound13,file://d2),
            act(image8,"SEE YOU AGAIN!",sound14,http://d3),
        ),ok),
    <rule
    message>
        input_message(text)
        text="ask(Sender,Me,Order)"->
            test(action(Order,_,Response)),
            tell(Me,Sender,Response)
        text=?->
            act(image4,"I CANNOT REPLY TO THE QUESTION",sound4,http://a4)
    <message
<agentscript
```

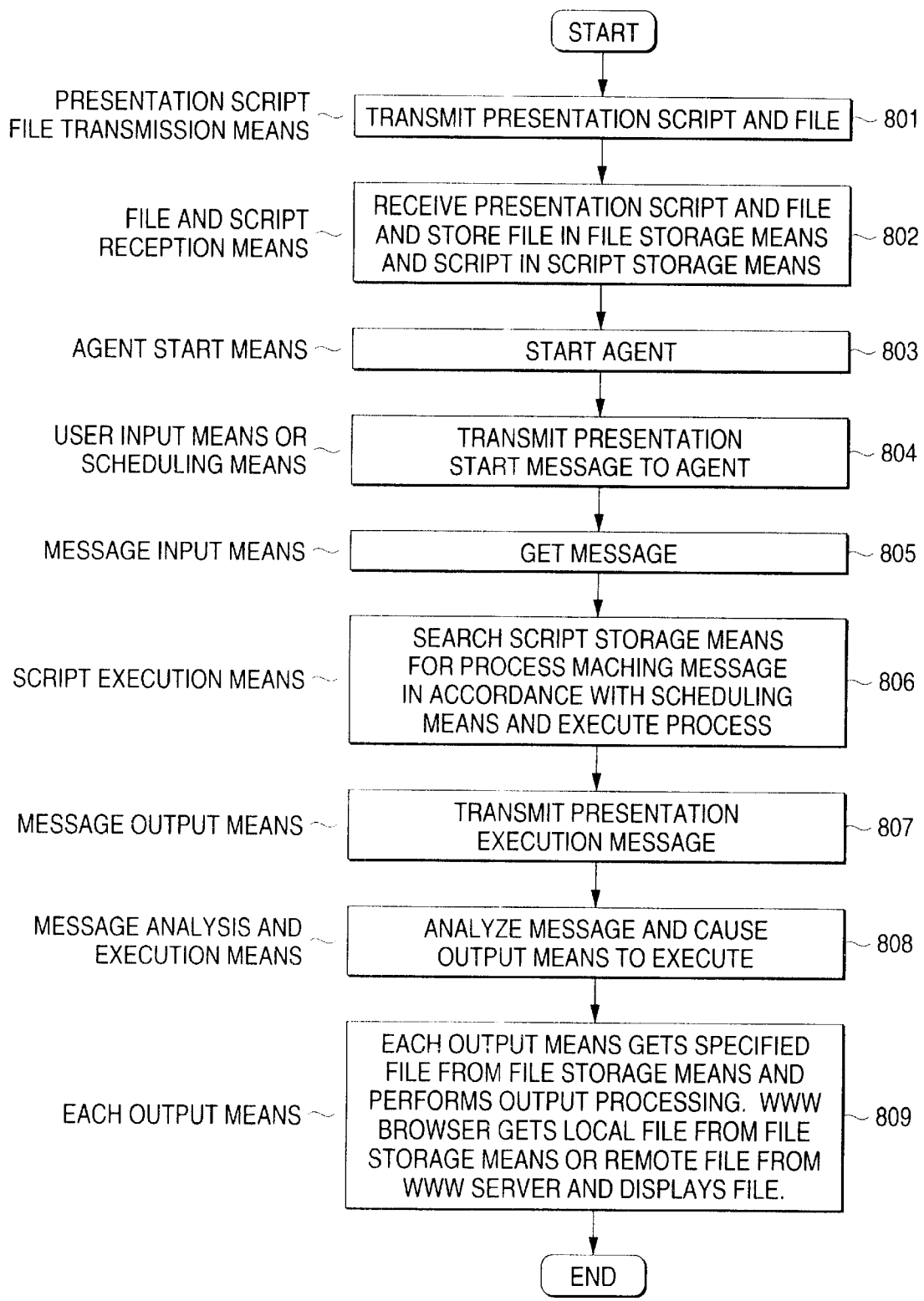

FIG. 10

```
agentscript>
   id>agent1<id
   knowledge>
     info([Serv,[yahoo_ag,altavista_ag]])
   <knowledge
   rule>
     action([_,search,_,Key,_,Serv],[know:info([Serv|info])],info])
     action([search,_,Key,_,yahoo_],_,yahoo_ag)
     action([search,_,Key,_,altavista],_,altavista_ag)
     action([display_pages,_,URLS,_,Serv],_,browser)
   <rule
   message>
     input_message(text)
     text="ask(Sender,Me,Order)"->
          test(action(Order,_,Serve])),
          test(Me,Serv,Order)
   <message
<agentscript
```

FIG. 11

```
agentscript>
    id>yahoo_ag<id
    knowledge>
<knowledge
    rule>
action([_,search,_,Key,_,_],[get_page([Key,URLS])],
        [_,display_pages,_,URLS,_,yahoo_ag])
    <rule
    message>
      input_message(text)
      text="ask(Sender,Me,Order)"->
            test(action(Order,_Order2)),
            tell(Me,Sender,Order2)
    <message
<agentscript
```

FIG. 15

```
agentscript>
   id>agent1<id
   knowledge>
     info([videoA,[price,is_,10000en,_,_]])
   <knowledge
   rule>
     action([_,teach,Object,price,_,_],
         (
           [know:info([Object|info])],
           act(image2,Info,sound2,http://a2)
         )
         ,Info)
     action(Sender,[price,is,_,Price,_,_],
         (
           [know:info([Object,[_,_,_,MyPrice,_,_]])]
           Price<=MyPrice,
           act(image3,"WE THROW IN VIDEOB!",sound1http://a1)
         ),
         [I,will add_,videoB,_,_])

<rule
   message>
     input_message(text)
     text="ask(Sender,Me,Order)"->
           test(action(Order,_,Response)),
           tell(Me,Sender,Response)
     text="tell(Sender,Me,What)"->
           test(action(Sender,What,_Response)),
           tell(Me,Sender,Response)

<message
<agentscript
```

FIG. 16

```
agentscript>
   id>agent2<id
   knowledge>
      info([videoA,[price,is_,12000en,_,_]])

<knowledge
   rule>
      action([_,teach,Object,price,_,_],
              (
                [know:info([Object|info])],
                act(image4,Info,sound4,http://a4)
              )
              ,Info)
      action(Sender,[price,is,_,Price,_,_],
              (
                [know:info([Object,[_,_,_,MyPrice,_,_]])]
                Price<=MyPrice,
              ),
              [price,is,_,Price*0.75,_,_])
   <rule
   message>
      input_message(text)
      text="ask(Sender,Me,Order)"->
             test(action(Order,_,Response)),
             tell(Me,Sender,Response)
      text="tell(Sender,Me,What)"->
             test(action(Sender,What,_Response)),
             tell(Me,Sender,Response)

<message
<agentscript
```

FIG. 19

```
agentscript>
    id>agent1<id
    knowledge>
        info([tomato,[price,is_,120en,_,storeA]])
        info([kyuri,[price,is_,100en,_,storeA]])
        info([nasu,[price,is_,130en,_,storeA]])
    <knowledge
    rule>
        action([_,teach,your,info,_,_],[know_all:info([Object|info])],info)
        action([names,are,_,Names,_,_],_,[_,teach,your,info,_,_],Names])
    <rule
    message>
        input_message(text)
        text="ask(Sender,Me,Order)"->
            test(action(Order,_,Response)),
            tell(Me,Sender,Response)
        text="tell(Sender,Me,Order)"->
            test(action(Order,_,[Response,Others])),
            ask(Me,Others,Response)
    <message
<agentscript
```

FIG. 20

```
agentscript>
   id>agent2<id
   knowledge>
      info([tomato,[price,is_,130en,_,storeB]])
      info([kyuri,[price,is_,90en,_,storeB]])
      info([nasu,[price,is_,140en,_,storeB]])
   <knowledge
   rule>
      action([_,teach,your,info,_,_],[know_all:info([Object|info])],info)
      action([names,are,_,Names,_,_],_,[_,teach,your,info,_,_],Names])
   <rule
   message>
      input_message(text)
      text="ask(Sender,Me,Order)"->
            test(action(Order,_,Response)),
            tell(Me,Sender,Response)
      text="tell(Sender,Me,Order)"->
            test(action(Order,_,[Response,Others])),
            ask(Me,Others,Response)

<message
<agentscript
```

FIG. 23

```
agentscript>
    id>tv_agent<id
    knowledge>
       info([relation-agent,video_agent)
    <knowledge
    rule>
       action([_,explain,your,product,_,placeA],
              (
                  act(image3,"This is new our TV",sound1,http://a1),
                  info([relation-agent,RelationAgent)
              )
              ,[RelationAgent, [_,explain,your,product,_,placeA]])
       action([_,explain,your,product,_,OtherPlace],
              (
                  go(OtherPlace),
                  act(image3,"This is new our TV",sound1,http://a1),
                  info([relation-agent,RelationAgent)
              )
              ,[RelationAgent, [_,explain,your,product,_,OtherPlace]])
    <rule
    message>
       input_message(text)
       text="ask(Sender,Me,Order)"->
              test(action(Order,_,[RelationAgent,Response])),
              ask(Me,RelationAgent,Response)
    <message
<agentscript
```

FIG. 24

```
agentscript>
   id>video_agent<id
   knowledge>
      info([relation-agent,video_tape_agent)
   <knowledge
   rule>
      action([_,explain,your,product,_,placeB],
            (
               act(image4,"This is a good video for the TV",sound2,http://a2),
               info([relation-agent,RelationAgent)
               info([response,Response])
            )
            ,[RelationAgent, [_,explain,your,product,_,placeB]])
      action([_,explain,your,product,_,OtherPlace],
            (
            go(OtherPlace),
            act(image4,"This is a good video for the TV",sound2,http://a2),
            info([relation-agent,RelationAgent)
            )
            ,[RelationAgent, [_,explain,your,product,_,OtherPlace]])
   <rule
   message>
      input_message(text)
      text="ask(Sender,Me,Order)"->
            test(action(Order,_,[RelationAgent,Response])),
            ask(Me,RelationAgent,Response)
   <message
<agentscript
```

FIG. 27

```
agentscript>
    id>tv_agent<id
    knowledge>
    <knowledge
    rule>
        action([_,explain,your,product,_,OtherPlace],
            go)OtherPlace),_
        )
    <rule
    message>
        input_message(text)
        text="ask(Sender,Me,Order)"->
            test(action(Order,_)),
    <message
<agentscript
```

FIG. 30 agentscript>
   id>tv_agent<id
   knowledge>
   <knowledge
   rule>
action([_,explain,your,product,_,OtherPlace],go(OtherPlace),_)
   <rule
   message>
    input_message(text)
    text="ask(Sender,Me,Order)"->
       test(action(Order,_)),
   <message
<agentscript

AGENT PRESENTATION APPARATUS

BACKGROUND OF THE INVENTION

This invention relates to an agent presentation apparatus for transmitting and receiving a message and operating based on a knowledge base (knowledge description) and a rule base (action description) and in particular to an agent presentation apparatus wherein an agent for carrying out a user's request in user's behalf uses knowledge of knowledge description, action description, etc., between agents and executes communication.

Available expert systems in related arts are as shown in FIGS. 32 and 33. They are provided by rewriting background examples in a format close to the invention and do not strictly match the background examples. "Script" called in the invention are called "knowledge base" in the background examples. "Script execution means" called in the invention are called "inference engine" or "presentation execution means" in the background examples. FIGS. 32 and 33 use the "script" and "script execution means," terms of the invention. An expert system to which network communication is added is called "agent" in the invention.

The expert system shown in FIG. 32 is a background example disclosed in JP-A-6-51935. Script storage means stores description of knowledge for displaying a number of presentation documents in a window system and description of the display operation of the next presentation document for the button selected in the window system. Presentation framework can be used in common and a presentation system can be constructed easily.

The expert system shown in FIG. 33 is a background example disclosed in JP-A-5-143346. To describe the inference result of script execution means and the process to the inference result, the script execution means drives a driver for displaying text, graphics, a moving picture, a still image, voice, etc., for easy understanding and enhancing the utility value of the expert system.

However, in the expert systems in the related arts, presentation contents need to be all prepared matching each presentation. A mechanism for enabling use of already existing contents, a function of using contents on a network, and a mechanism for previously downloading contents on a network for local use are not available. Since the network is not considered, a large number of contents in a wide range cannot be used.

Further, a mechanism for making it possible to make presentation adjusted to a schedule is not available and it is impossible to make spontaneous presentation over a wide area by moving between machines of presentation systems.

It is impossible to make a search for contents on a network inclusively and present the contents of the search result directly for the user in order like a slide show. The search result cannot be held for later report like a slide show. Contents and address thereof cannot be sent from any other agent or system for making a presentation. It is impossible to make presentations compete with each other. Automatic information exchange between agents, introduction of other agents, search of the agent itself, calling of an agent from a WWW browser, and the like cannot be executed.

SUMMARY OF THE INVENTION

It is therefore an object of the invention to make it possible to use a large number of already existing contents with an agent presentation apparatus. It is another object of the invention to make it possible to use a schedule to view a plurality of presentations in response to the time like TV programs, to cause agents to compete with each other for presentation, and to search for an agent and call the found agent.

To the ends, according to the invention, there is provided a n agent presentation apparatus comprising user input means for inputting a user message, an agent for processing the user message and outputting a presentation message, message analysis and execution means for analyzing the presentation message and generating an output instruction, image output means for outputting an image in accordance with the output instruction, text output means for outputting text in accordance with the output instruction, voice output means for outputting a voice in accordance with the output instruction, a WWW browser for displaying a WWW page in accordance with the output instruction, file storage means for storing files of the output means, and a WWW server for getting a WWW page and executing a command according to an instruction from the WWW browser, wherein the agent comprises message input means for receiving the user message, script storage means for storing a script consisting of knowledge description and action description, script execution means for executing the script based on description selected by executing pattern matching between the user message and the script, and message output means for transmitting a presentation message from the script execution means.

According to the configuration, the agent can start the WWW browser and use a large number of already existing contents to make a presentation. Driving the WWW browser means the operation of the browser such as "return," "advance," "stop," "update," "quit," and "move."

The agent presentation apparatus further includes scheduling means for transmitting and receiving a message to and from the user input means and the script execution for managing a presentation schedule, presentation script and file transmission means for transmitting a presentation script and a file, file and script reception means for receiving a file and a presentation script from the presentation script and file transmission means, storing the file and the presentation script in the file storage means and the script storage means, and generating a reception notification signal, and agent start means for staring the agent if the reception notification signal is received and it is determined that necessary script and file have been received.

According to the configuration, a schedule can be used to view a plurality of presentations in response to the time like TV programs The agent presentation apparatus further includes an agent for receiving a search message, converting the search message into a message for making a request for searching WWW pages, and transmitting a URL of the search result as a message to the agent sending the search message and a search server for searching WWW pages and returning a page containing the URL of the corresponding page.

According to the configuration, a dedicated agent can be used as an interface to more than one search server, the URL of the search result can be received, and the contents can be displayed on the WWW browser at the URL for the user to directly view the search result.

The agent presentation apparatus further includes agent management means for registering agents, transmitting a message from the user input means to the registered agents, and transmitting a message transmitted from each agent to the registered agent other than the message transmitting agent.

According to the configuration, input/output messages can be exchanged between the agents for making a presentation and the agents can be made to compete with each other for presentation.

The agent presentation apparatus further includes agent transfer means for transferring an agent, agent start and termination means for starting and terminating the transferred agent, and agent management means for registering and deleting an agent in response to notification from the agent start and termination means and when an agent is registered, for transmitting a previously registered agent name to the newly registered agent and the newly registered agent name to the previously registered agent.

According to the configuration, the WWW browser can be used to make presentations one after another on the network.

The agent presentation apparatus further includes an agent for transmitting a call message, agent transfer means for transferring a called agent to the location of the calling agent, and agent start and termination means for starting the called agent.

According to the configuration, information can be automatically exchanged and another relevant agent can be introduced and can be moved by the agent transfer means, so that relevant agents can come one after another for making a presentation.

The agent presentation apparatus further includes user input means for inputting a keyword for searching for the user-desired agent and a search system for searching for the corresponding agent according to the keyword and transmitting a message for calling the corresponding agent.

According to the configuration, a search can be made for an agent and the found agent can be called.

The agent presentation apparatus further includes message preparation means for preparing a message for selecting an agent out of the WWW browser and calling the agent through the WWW server.

According to the configuration, a program called from the WWW browser is provided with message preparation and transmission functions to an agent, whereby the agent can be called from the WWW browser.

According to the first aspect of the invention, there is provided an agent presentation apparatus comprising user input means for inputting a user message, an agent for processing the user message and outputting a presentation message, message analysis and execution means for analyzing the presentation message and generating an output instruction, image output means for outputting an image in accordance with the output instruction, text output means for outputting text in accordance with the output instruction, voice output means for outputting a voice in accordance with the output instruction, a WWW browser for displaying a WWW page in accordance with the output instruction, file storage means for storing files of the output means, and a WWW server for getting a WWW page and executing a command according to an instruction from the WWW browser, wherein the agent comprises message input means for receiving the user message, script storage means for storing a script consisting of knowledge description and action description, script execution means for executing the script based on description selected by executing pattern matching between the user message and the script, and message output means for transmitting a presentation message from the script execution means. The agent presentation apparatus of the invention has the advantage that the agent uses the knowledge description and the action description to drive the WWW browser for making a presentation.

According to the second aspect of the invention, there is provided an agent presentation method comprising the steps of executing pattern matching between a user message entered by the user and a script held in an agent, selecting and executing the corresponding description, outputting a presentation message, analyzing the presentation message, generating an output instruction, outputting an image, text, or a voice in accordance with the output instruction, getting and displaying a WWW page from a WWW server or a file system, driving a WWW browser, and making a presentation to the user based on user input from the WWW browser. The agent presentation method of the invention has the advantage that the agent uses the knowledge description and the action description to drive the WWW browser for making a presentation.

BRIEF DESCRIPTION OF THE DRAWINGS

In the accompanying drawings:

FIG. 2 is a drawing to show knowledge description and action description of the agent in the first embodiment of the invention;

FIG. 5 is a drawing to show knowledge description and action description of the agent in the second embodiment of the invention;

FIG. 6 is a drawing to show knowledge description and action description of the agent in the second embodiment of the invention;

FIG. 7 is a drawing to show knowledge description and action description of the agent in the second embodiment of the invention;

FIG. 8 is a flowchart to show the procedure of the agent in the second embodiment of the invention;

FIG. 10 is a drawing to show knowledge description and action description of the agent in the third embodiment of the invention;

FIG. 11 is a drawing to show knowledge description and action description of the agent in the third embodiment of the invention;

FIG. 15 is a drawing to show knowledge description and action description of the agent in the fourth embodiment of the invention;

FIG. 16 is a drawing to show knowledge description and action description of the agent in the fourth embodiment of the invention;

FIG. 19 is a drawing to show knowledge description and action description of the agent in the fifth embodiment of the invention;

FIG. 20 is a drawing to show knowledge description and action description of the agent in the fifth embodiment of the invention;

FIG. 23 is a drawing to show knowledge description and action description of the agent in the sixth embodiment of the invention;

FIG. 24 is a drawing to show knowledge description and action description of the agent in the sixth embodiment of the invention;

FIG. 27 is a drawing to show knowledge description and action description of the agent in the seventh embodiment of the invention;

FIG. 30 is a drawing to show knowledge description and action description of the agent in the eighth embodiment of the invention;

DETAILED DESCRIPTION OF THE PREFERRED EMBODIMENTS

Referring now to the accompanying drawings (FIGS. 1 to 31), there are shown preferred embodiments of the invention.

First Embodiment

Figure 1:
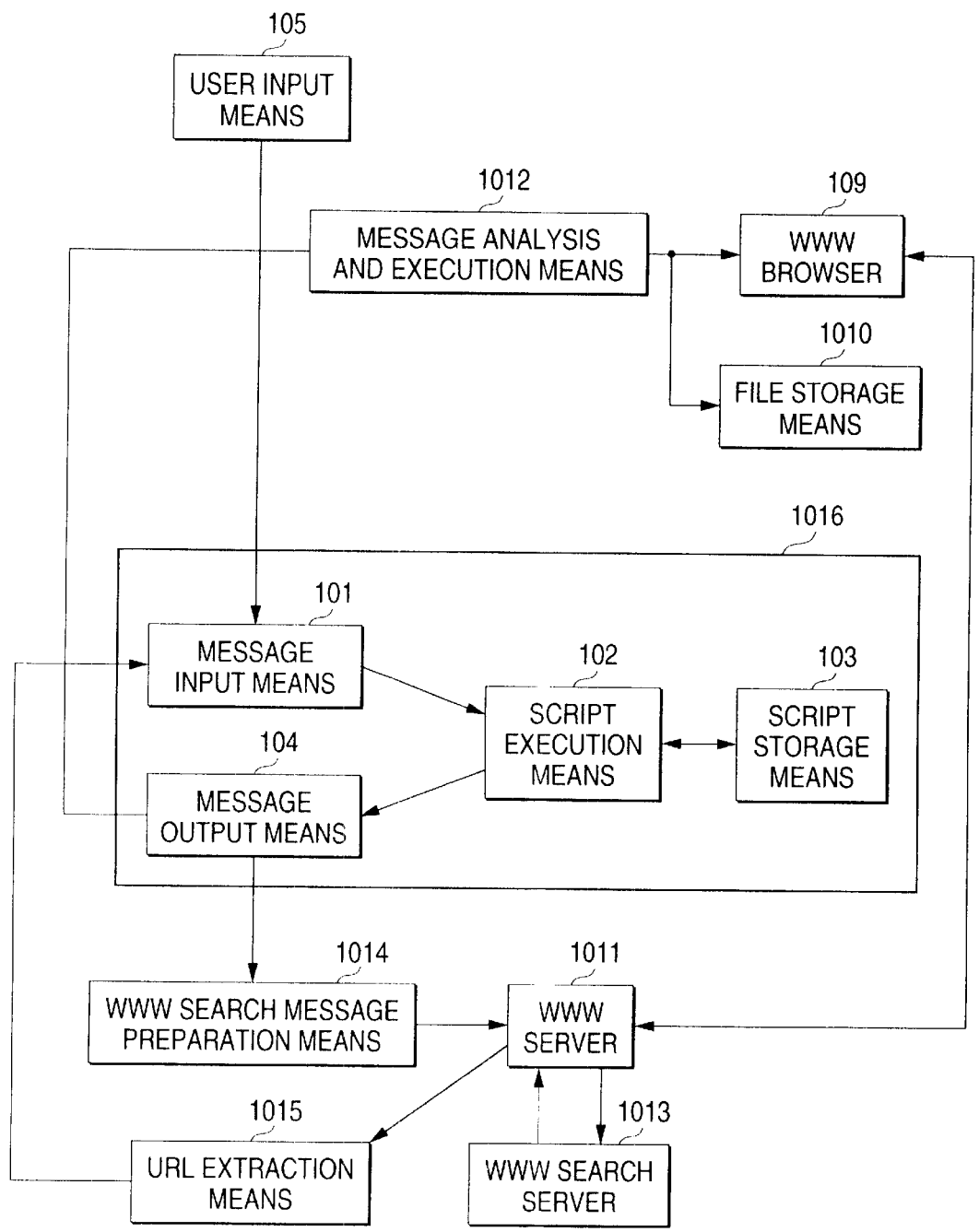
FIG. 1 is a block diagram of an agent in an agent presentation apparatus in a first embodiment of the invention.

A first embodiment of the invention will be discussed with reference to FIG. 1. FIG. 1 is a conceptual drawing to show the configuration of the agent presentation apparatus in the first embodiment of the invention. In the figure, numeral 101 denotes message input means 101 for receiving a message, numeral 102 denotes script execution means for finding a pattern matching script from script storage means 103 in response to the received message and executing the found script, numeral 103 denotes the script storage means for storing a script consisting of knowledge description and action description, numeral 104 denotes message output means 104 for transmitting a message, numeral 105 denotes user input means 105 for inputting a message from the user to the message input means 101, numeral 109 denotes a WWW browser for displaying a WWW page, numeral 1010 denotes file storage means for storing files used with the WWW browser 109, numeral 1011 denotes a WWW server 1011 for transferring a WWW page on a network based on an instruction from the WWW browser 109 and executing a program, numeral 1012 denotes message analysis and execution means 1012 analyzes a message from the message output means 104 and executes each output means, numeral 1013 denotes a WWW search server for searching for a WWW page, numeral 1014 denotes WWW search message preparation means for preparing a search message for the WWW search server 1013, and numeral 1015 denotes URL extraction means for extracting a URL from a search result page from the WWW search server 1013 and returning the URL as the search result to the message input means 101 of agent.

Figure 3:
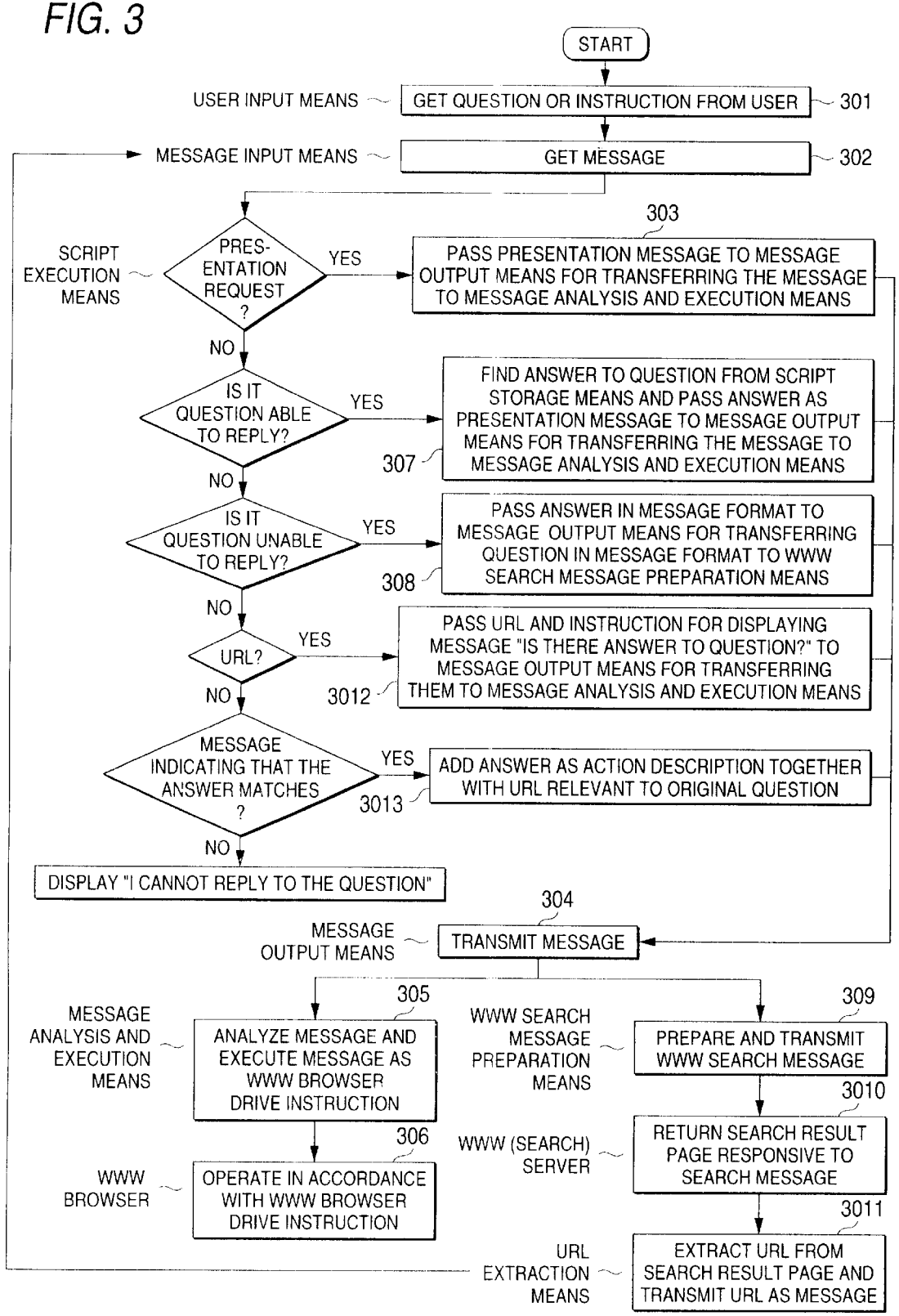
FIG. 3 is a flowchart to show the procedure of the agent in the first embodiment of the invention.

The operation of the described agent presentation apparatus of the first embodiment of the invention is as follows: FIG. 2 is a drawing to show a script consisting of knowledge description, action description, and message description stored in the script storage means 103. The script shown in FIG. 2 is a script for making a presentation of its own function, wherein the description from "knowledge>" to "<knowledge" is the knowledge description, the description from "rule>" to "<rule" is the action description, and the description from "message>" to "<message" is the message description. An operation sequence for the user to instruct the agent to make a presentation and for the agent to make a presentation in response to the instruction will be discussed with reference to a flowchart of FIG. 3. FIG. 3 shows the operation procedure of the agent presentation apparatus. The operation description to follow with reference to FIG. 3 assumes that the script in FIG. 2 is stored in the script storage means of the agent.

In FIG. 3, first the user enters a presentation start command through the user input means 105 at step 301. Then, the message input means 101 gets a message of "ask (user, agent1, [__,do,__,presentation,__,__])" at step 302. This message requires the corresponding action description. The script execution means 102 matches the message with the "text" part of "input_message(text)" of the message description in the script shown in FIG. 2 stored in the script storage means 103. On the next and later lines, a search is made for the pattern matching message starting at "text=." If no pattern matching message is found or execution based on the pattern matching description contents or detailed pattern matching results in failure, the matching reaches the last "?." The current message matches "ask (Sender, Me, Order)" following text=. The parts beginning with an uppercase letter are variables. The matching continues to the next line "test (action (Order, _, Response))." Pattern matching is executed between the part of "test . . . " and the action description from "rule>" to "<rule" above the part of "test . . . " In this case, "action ([__, do, __, presentation,__,__], . . . " is found. In this case, the description starting at the next line is executed in order. The description "act(image1, "explanation agent", sound1, http://a1)" is a presentation execution message transmission instruction for instructing the message analysis and execution means 1012 to cause the WWW browser 109 to display a page at URL, http://a1 (steps 303, 304, 305, and 306). (for image1, "explanation agent", sound1, the data is output to the WWW browser or any output means other than the WWW browser.) On the subsequent lines, likewise, a presentation is made using the WWW browser.

If the script execution means 102 gets a message of "ask (user, agent1, [__, teach, __, price, __, __])" as a question of a price from the user input means 105, the agent can reply to the answer in the description range in the script, such as "free," as a result of pattern matching similar to the previous pattern matching. (Steps 301, 302, and 307)

If pattern matching with the user's question results in failure, a part of "text=ask (Sender, Me, [_, What, Whose, Whom, When, Where]" is found and on "search ( . . . )" following this part, the question is passed to the WWW search message preparation means 1014, which then prepares a WWW search message and transmits the message to the WWW search server. (Steps 301, 302, 308, 304, 309, and 3010) The WWW search server 1013 returns a search result page. The URL extraction means 1015 receives the search result page, extracts the URL from the search result page, and transmits the URL to the message input means as a message. (Steps 3011 and 302) If the message contains URL, the script execution means 102 transmits the URL together with an instruction for displaying a message of "is there an answer to the question?" to the message analysis and execution means 1012 and displays the search result page together with the message "is there an answer to the question?" on the WWW browser, prompting the user to make a determination. (Steps 3012, 304, 305, and 306) If a message indicating that the page displayed on the WWW browser matches is received from the user, operation description consisting of the original question and the URL of the displayed page is added to the script in the script storage means 103. In the script in FIG. 2, a determination of "action ([_, answer, is, ok, _, _] . . . " is given from the user, "got_answer(ok) is temporarily recorded according to "learn(got_answer(ok))," and if "got_answer (ok)" is found at the place of " action ([_, report, _, Pages, _, _], . . . ), URL "Page" of the WWW page corresponding to the user' question "[_, What, Whose, Whom, When, Where])" is added as action description at the place of "learn (action ([_, What, Whose, Whom, When, Where], . . . Page)" (step 3013).

As described above, in the first embodiment of the invention, the agent can get a WWW page locally or from the network as already existing contents and make a presentation using the WWW page. A reply to a question about the WWW page can also be made using the knowledge description and action description. If a reply to a question cannot be made in the current action description and knowledge description, a relevant WWW page is displayed for requesting the user to make a determination, whereby the WWW page can be used to make a reply to the same question later.

It is also possible to transmit a presentation message from the agent at certain intervals or in response to an input message from the user.

Second Embodiment

A second embodiment of the invention provides an agent presentation apparatus wherein upon reception of a presentation script file and a file required for presentation, an agent is started, then sends a message to a WWW browser, etc., in accordance with the specified time or a schedule and makes a presentation to the user through outputting and inputting information to and from the WWW browser.

Figure 4:
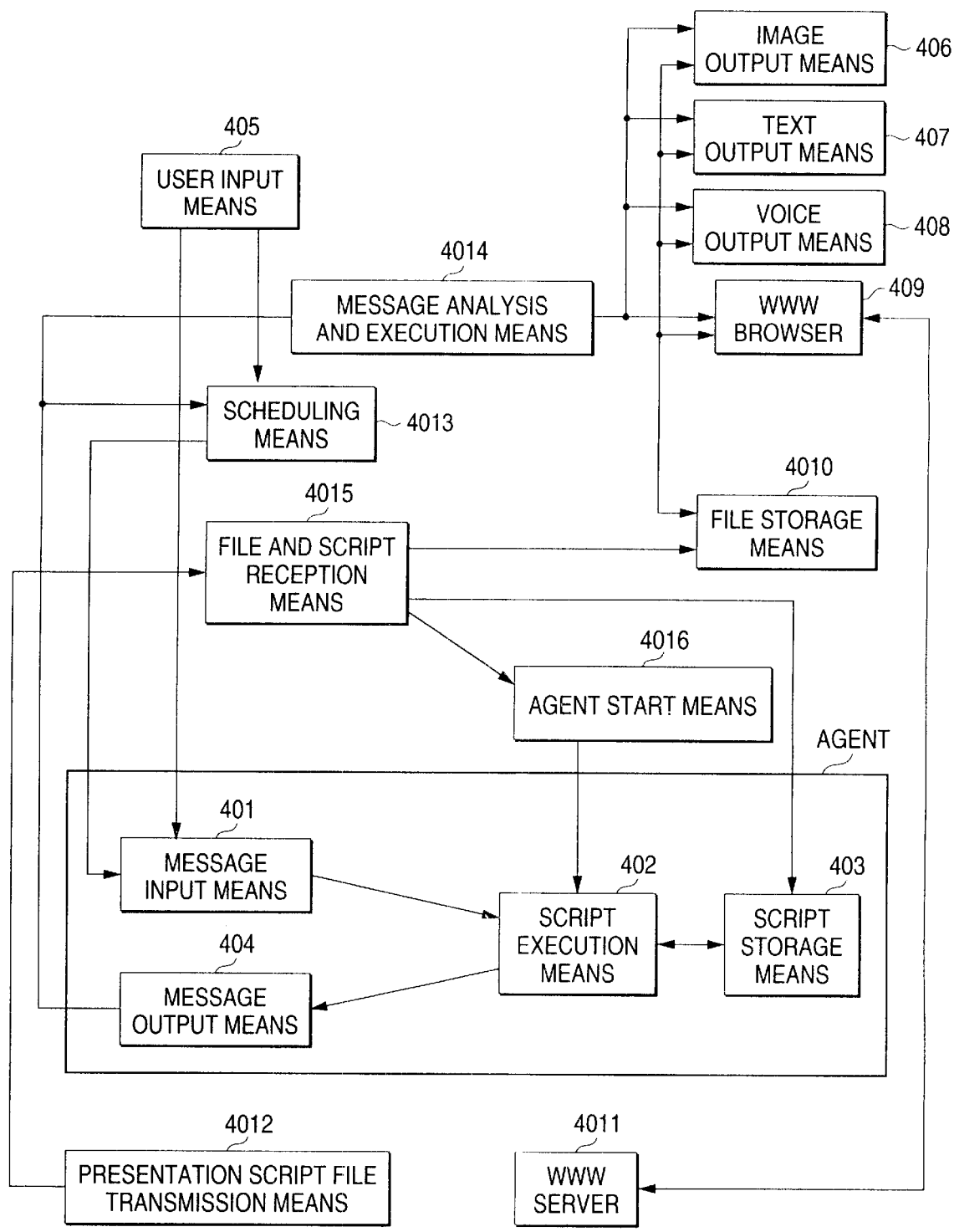
FIG. 4 is a block diagram of an agent in an agent presentation apparatus in a second embodiment of the invention.

FIG. 4 is a conceptual drawing to show the configuration of the agent presentation apparatus in the second embodiment of the invention. In the figure, message input means 401 is means for receiving a message. Script execution means 402 is means for finding a pattern matching script from script storage means 403 in response to the received message and executing the found script. The script storage means 403 is means for storing a script consisting of knowledge description and action description. Message output means 404 is means for transmitting a message. User input means 405 is means for inputting a message from the user to the message input means 401. Image output means 406 is means for outputting a message. Text output means 407 is means for outputting text. Voice output means 108 is means for outputting a voice. A WWW browser 409 is means for displaying a WWW page. File storage means 4010 is means for storing files used with the output means 406 to 409. A WWW server 4011 is means for transferring a WWW page on a network based on an instruction from the WWW browser 109 and executing a program. Presentation script and file transmission means 4012 is means for transmitting a script for making a presentation and a file required for the presentation to file and script reception means 4015. Scheduling means 4013 informs the script execution means 402 of presentation execution based on a message from the user input means 405 or any other agent or at the specified time. Message analysis and execution means 4014 analyzes a message from the message output means 404 and executes each output means. The file and script reception means 4015 receives a file and a script from the presentation script and file transmission means 4012 and stores the file and the script in the file storage means 4010 and the script storage means 403 and upon completion of storing the file and the script, informs agent start means 4016 of the fact. The agent start means 4016 is means for starting the agent upon reception of the information from the file and script reception means 4015.

The operation of the described agent presentation apparatus of the second embodiment of the invention is as follows: FIG. 5 is a drawing to show a script consisting of knowledge description, action description, and message description stored in the script storage means 403. The scripts shown in FIGS. 5 to 7 are scripts of a program agent for making a presentation, wherein the description from "knowledge>" to "<knowledge" is the knowledge description, the description from "rule>" to "<rule" is the action description, and the description from "message>" to "<message" is the message description.

An operation sequence for the agent to make a presentation upon reception of a command from the user, at a determined time, or if no entry is made from the user will be discussed with reference to a flowchart of FIG. 8. FIG. 8 is a flowchart to show the operation procedure of the agent presentation apparatus of the second embodiment. The description to follow with reference to FIG. 8 assumes that the scripts shown in FIGS. 5 to 7 are stored in the script storage means of the agent. The pattern matching with the scripts and the processing method are similar to those in the first embodiment.

In FIG. 8, first the presentation script and file transmission means 4012 transmits a script and a file for presentation to the file and script reception means 4015 at step 801. The file and script reception means 4015 receives the script and the file at step 802. Upon completion of receiving the script and the file, the agent start means 4016 starts the agent. At this time, the agent having the script in FIG. 5 makes a presentation of a weather forecast in response to a presentation start message from the user. The agent having the script in FIG. 6 transmits the presentation start time described in the script (in this case, "16:00") to the scheduling means 4013 and when the specified time is reached, receives a presentation start message from the scheduling means 4013 and makes a presentation of a music program. The agent having the script in FIG. 7 starts a presentation of an art program if no response is made from the user input means or any other user input means such as a mouse. The operation procedure of each presentation is similar to that in the first embodiment (steps 804–809).

As described above, in the second embodiment of the invention, the agent presentation apparatus is configured as follows: Upon reception of a presentation script file and a file required for presentation, the agent is started, then sends a message to the WWW browser, etc. , in accordance with the specified time or a schedule and makes a presentation to the user through outputting and inputting information to and from the WWW browser. Thus, the agent can make a presentation in accordance with the specified time or a schedule.

In the second embodiment, the case where a presentation is made at the user's specified time or the determined time or if no entry is made from the user has been described. However, if a presentation is made in response to a command from any other user or agent on the network, the scheduling means may make a reference to the personal schedule of the user and a presentation may be made if the schedule is free.

Third Embodiment

A third embodiment of the invention provides an agent presentation apparatus wherein when an agent receives a search request message from the user or any other agent, it communicates with an agent dedicated to a search server, gets the target search result as a URL, and displays the search result page directly on a WWW browser.

Figure 9:
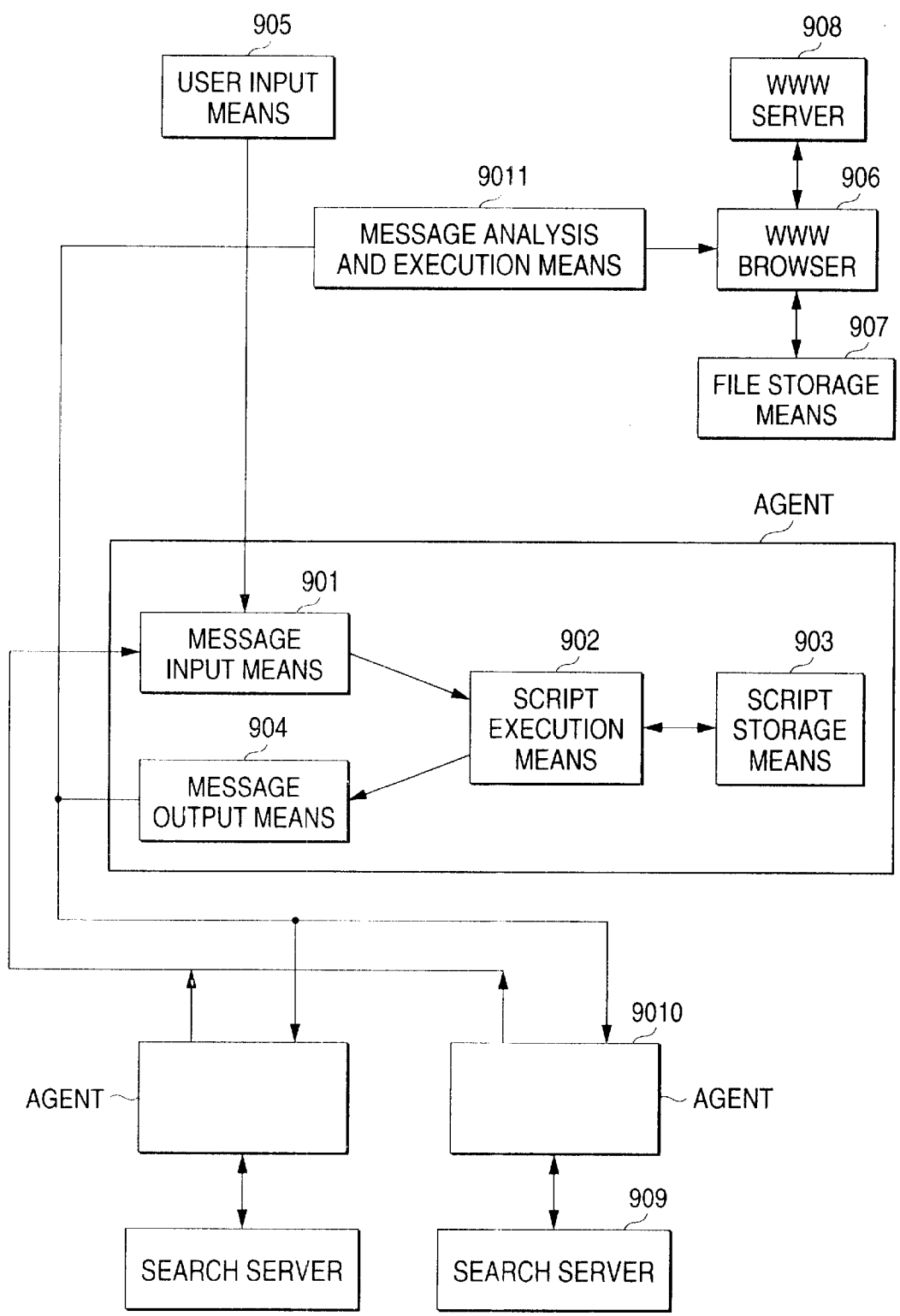
FIG. 9 is a block diagram of an agent in an agent presentation apparatus in a third embodiment of the invention.

FIG. 9 is a conceptual drawing to show the configuration of the agent presentation apparatus in the third embodiment of the invention. In the figure, message input means 901 is means for receiving a message. Script execution means 902 is means for finding a pattern matching script from script storage means 903 in response to the received message and executing the found script. The script storage means 903 is means for storing a script consisting of knowledge description and action description. Message output means 904 is means for transmitting a message. User input means 905 is means for inputting a message from the user to the message input means 901. A WWW browser 906 is means for displaying a WWW page. File storage means 907 is means for storing files used with the WWW browser 906. A WWW server 908 is means for transferring a WWW page on a network based on an instruction from the WWW browser 906 and executing a program. A search server 909 is means being responsive to a message containing a keyword for returning a page comprising the URL of the corresponding www page. An agent 9010 converts a search request message from an agent into a message containing a search keyword responsive to the search server 909, extracting the URL from the page comprising the URL of the corresponding WWW page from the search server 909, and transmitting the page comprising the URL to the agent making the search request.

The operation of the described agent presentation apparatus of the third embodiment of the invention is as follows: FIG. 10 is a drawing to show a script consisting of knowledge description, action description, and message description stored in the script storage means 903. The script shown in FIG. 10 is a script for transmitting a search request containing a search keyword from the user to the agent of the search server in charge and upon reception of URL of the search result, displaying the search result pages on the WWW browser 906 in order according to the URL. The script shown in FIG. 11 is a script for getting a search request message from agent, converting the message into a message to the search server in charge, transmitting the provided message to the search server, getting the search result page, extracting necessary ULR from the page, and sending the URL as a reply message. In the scripts in FIGS. 10 and 11, the description from "knowledge>" to "<knowledge" is the knowledge description, the description from "rule>" to "<rule" is the action description, and the description from "message>" to "<message" is the message description.

Figure 12:
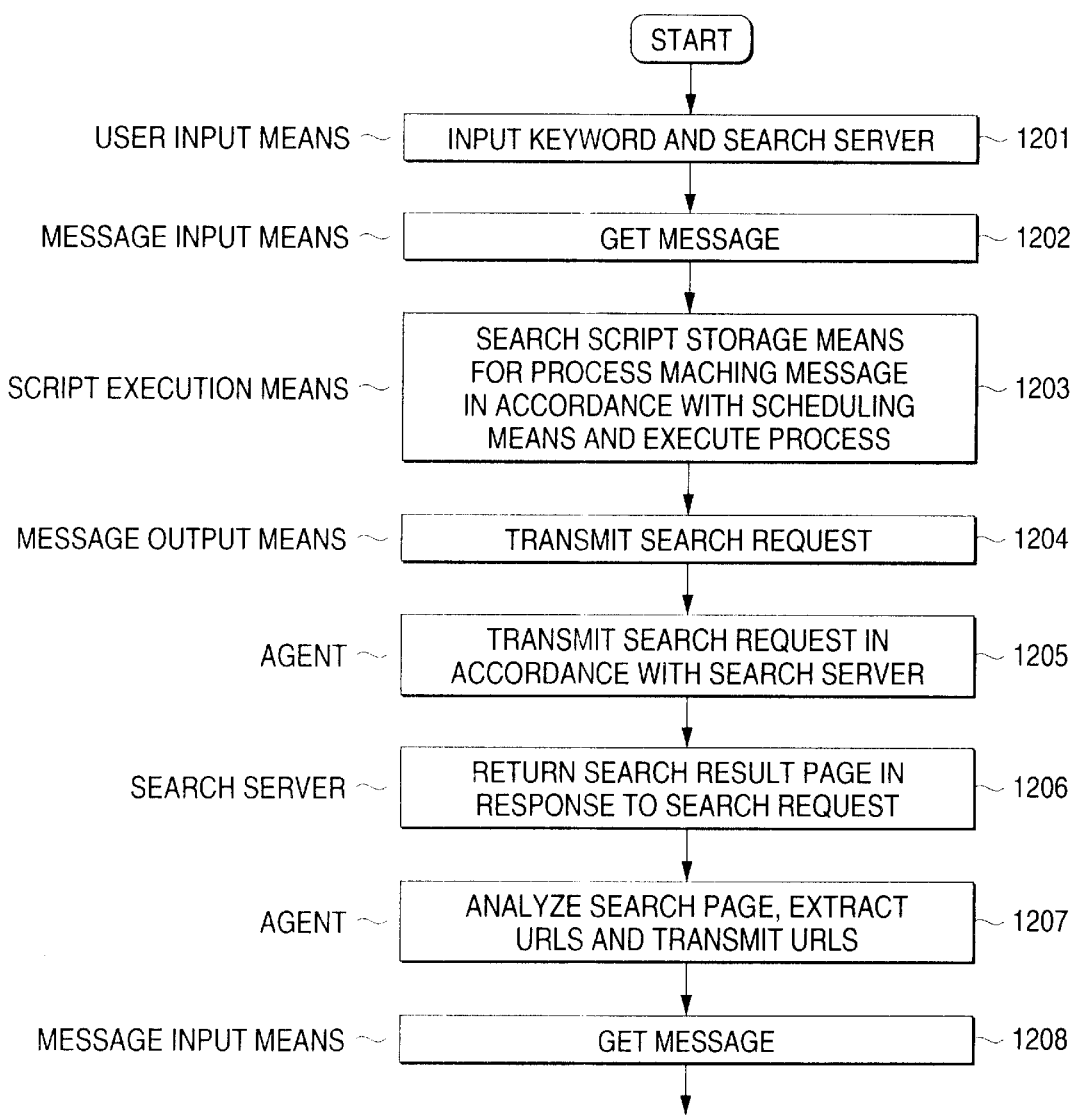
FIG. 12 is a flowchart to show the procedure of the agent in the third embodiment of the invention.
Figure 13:
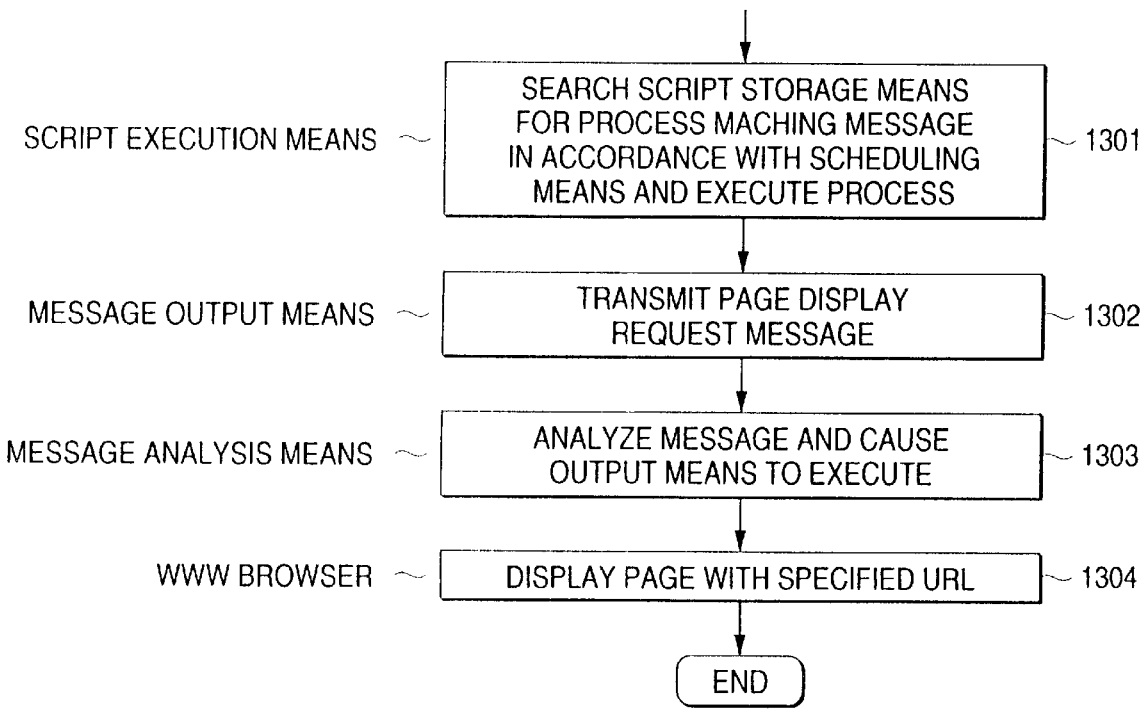
FIG. 13 is a flowchart to show the procedure of the agent in the third embodiment of the invention.

An operation sequence from the user issuing a search request to the agent to display of the corresponding page on the WWW browser will be discussed with reference to flowcharts of FIGS. 12 and 13. FIGS. 12 and 13 are flowcharts to show the operation procedure of the agent presentation apparatus of the third embodiment. The operation description to follow with reference to FIGS. 12 and 13 assumes that the scripts in FIGS. 10 and 11 are stored in the script storage means of the agent.

In FIG. 12, first a search request is entered through the user input means 105 at step 1201. As the search request message, the message input means 901 gets a message of "ask (user, agent1, [_, search, _, Key, _, _])" at step 1202. Here, a specific search keyword is entered in Key. A description is given with the variable intact. This message requires the corresponding action description. The script execution means 902 matches the message with the "text" part of "input message(text)" of the message description in the script shown in FIG. 10 stored in the script storage means 903. On the next and later lines, a search is made for the pattern matching message starting at "text=" at step 1203. In this case, the message matches "ask (Sender, Me, Order)" following text=. The parts beginning with an uppercase letter are variables. The matching continues to the next line "test (action (Order, _, Serv))." Pattern matching is executed between the part of "test . . . " and the action description from "rule>" to "<rule" above the part of "test . . . " In this case, "action ([_, search, _,Key, _, Serv], . . . " is found. In this case, the variable "Serve" matches because the last field of the message (field meaning a location) is "_" (unlabeled variable). For example, if the field is "yahoo," the line below the field matches (the yahoo agent is requested to make a search). In this case, "Serv" matches, thus the adjacent description "know: info ([Serv| Info])" is executed. This instruction is a knowledge description reference instruction. Thus, if matching is found with the description from "knowledge>" to "<knowledge," "[yahoo_ag, altavista_ag]" matches the variable "Info."

This value matches "Serv" of "test (action (Order, _, Serv))." Corresponding to "Serv" "tell (Me, Serv . . . )," in this case, for the elements "yahoo_ag" and "altavista_ag" of the list "[yahoo_ag, altavista_ag]," "tell" is executed, and the search request message is transferred to the two agents at steps 1203 and 1204. The transferred search request message is transmitted to the agent 9010 corresponding to the search server at step 1205. Here, the yahoo agent yahoo_ag is the agent 9010.

If a search request message is "ask (agent1, yahoo_ag, [_, search, _, Key, _,_]) and similar matching to the previous matching is executed, "get_page ([Key| URLS])" is executed in the action description from "rule>" to "<rule." This instruction is an instruction for preparing a message corresponding to the search server with the specified keyword, transmitting a search request to the search server, getting the search result page, and getting the URL of the corresponding page from the search result page at step 1206.

The URL matches "URLS" of [\_display \_pages, \_, URLS, \_, yahoo\_ag]" and is returned as a message containing the URL to the transmitting person at the place of "tell" in the message description at step 1207. The message is received by the message input means at step 1208 and the corresponding WWW pages are displayed with the URLS on the WWW browser from the script in FIG. 10 at steps 1301 to 1304.

As described above, in the third embodiment of the invention, the agent presentation apparatus is configured as follows: When the agent receives a search request message from the user or any other agent, it communicates with the agent dedicated to the search server, gets the target search result as a URL, and displays the search result page directly on the WWW browser. Thus, messages are transmitted and received and in response to a search request from the user or any other agent, communication can be executed with the agent dedicated to each search server, the target search result can be gotten as a URL, and the search result page can be displayed directly on the WWW browser.

Fourth Embodiment

A fourth embodiment of the invention provides an agent presentation apparatus wherein agents are registered, a message from the user is transmitted to the registered agents, a message transmitted from each agent is transmitted to the registered agent other than the message transmitting agent, and the agents can compete with each other for presentation to the user while they communicate with each other.

Figure 14:
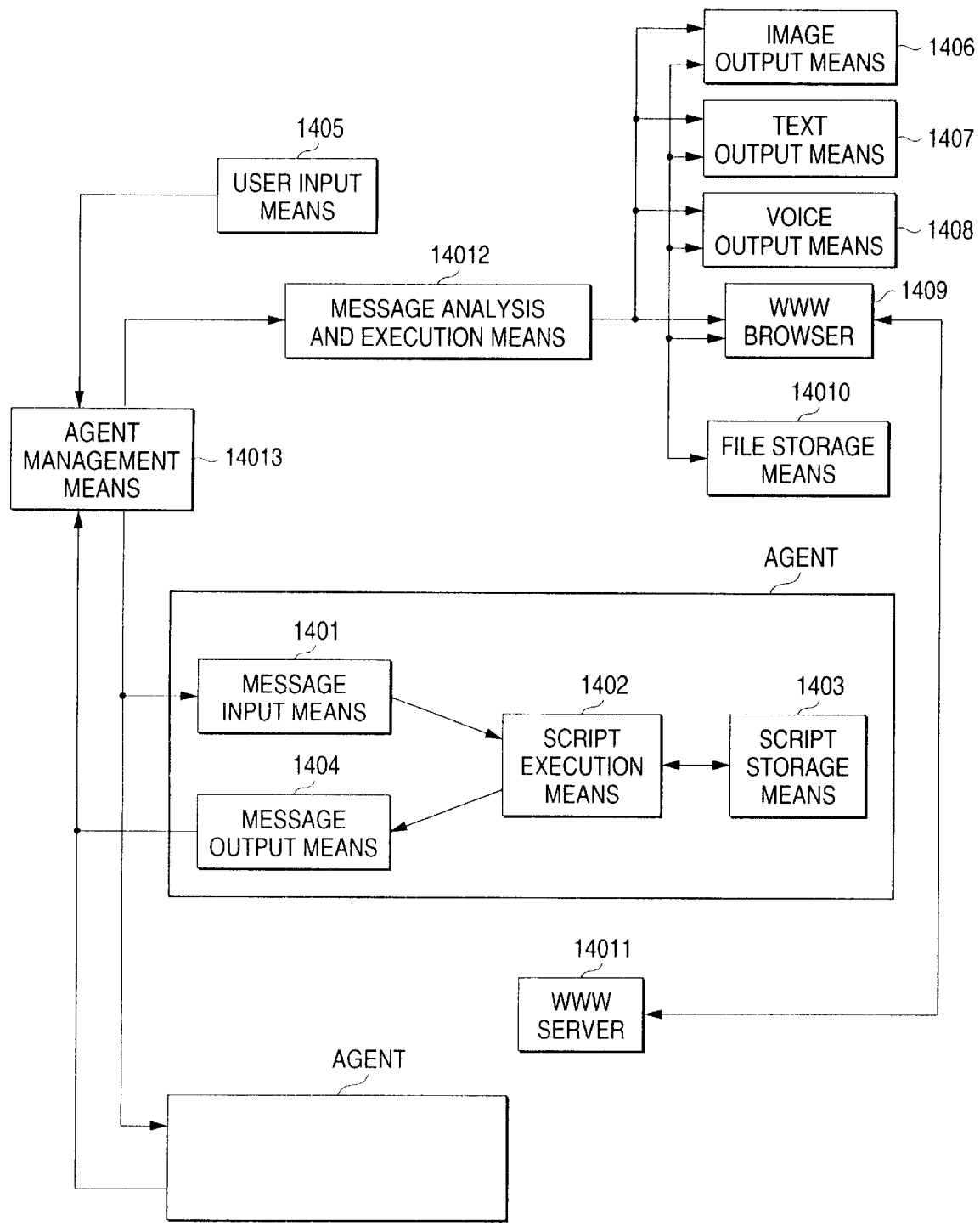
FIG. 14 is a block diagram of an agent in an agent presentation apparatus in a fourth embodiment of the invention.

FIG. 14 is a conceptual drawing to show the configuration of the agent presentation apparatus in the fourth embodiment of the invention. In the figure, message input means 1401 is means for receiving a message. Script execution means 1402 is means for finding a pattern matching script from script storage means 1403 in response to the received message and executing the found script. The script storage means 1403 is means for storing a script consisting of knowledge description and action description. Message output means 1404 is means for transmitting a message. User input means 1405 is means for inputting a message from the user to the message input means 1401. Image output means 1406 is means for outputting an image. Text output means 1407 is means for outputting text. Voice output means 1408 is means for outputting a voice. A WWW browser 1409 is means for displaying a WWW page. File storage means 14010 is means for storing files used with the output means 1406 to 1409. A WWW server 14011 is means for transferring a WWW page on a network based on an instruction from the WWW browser 1409 and executing a program. Message analysis and execution means 14012 analyzes a message from the message output means 1404 and drives each output means. Agent management means 14013 is means for registering agents, transmitting a message from the user input means 1405 to the registered agents, and transmitting a message from a registered agent to another agent.

The operation of the described agent presentation apparatus of the fourth embodiment of the invention is as follows: FIG. 15 is a drawing to show a script consisting of knowledge description, action description, and message description stored in the script storage means 1403. The scripts shown in FIGS. 15 and 16 are scripts each for replying to a question about the price of a commodity from the user, knowing the price of the commodity offered by another agent, lowering the price, and making a presentation of the lowered price to the user or throwing in a commodity, wherein the description from "knowledge>" to "<knowl-edge" is the knowledge description, the description from "rule>" to "<rule" is the action description, and the description from "message>" to "<message" is the message description.

Figure 17:
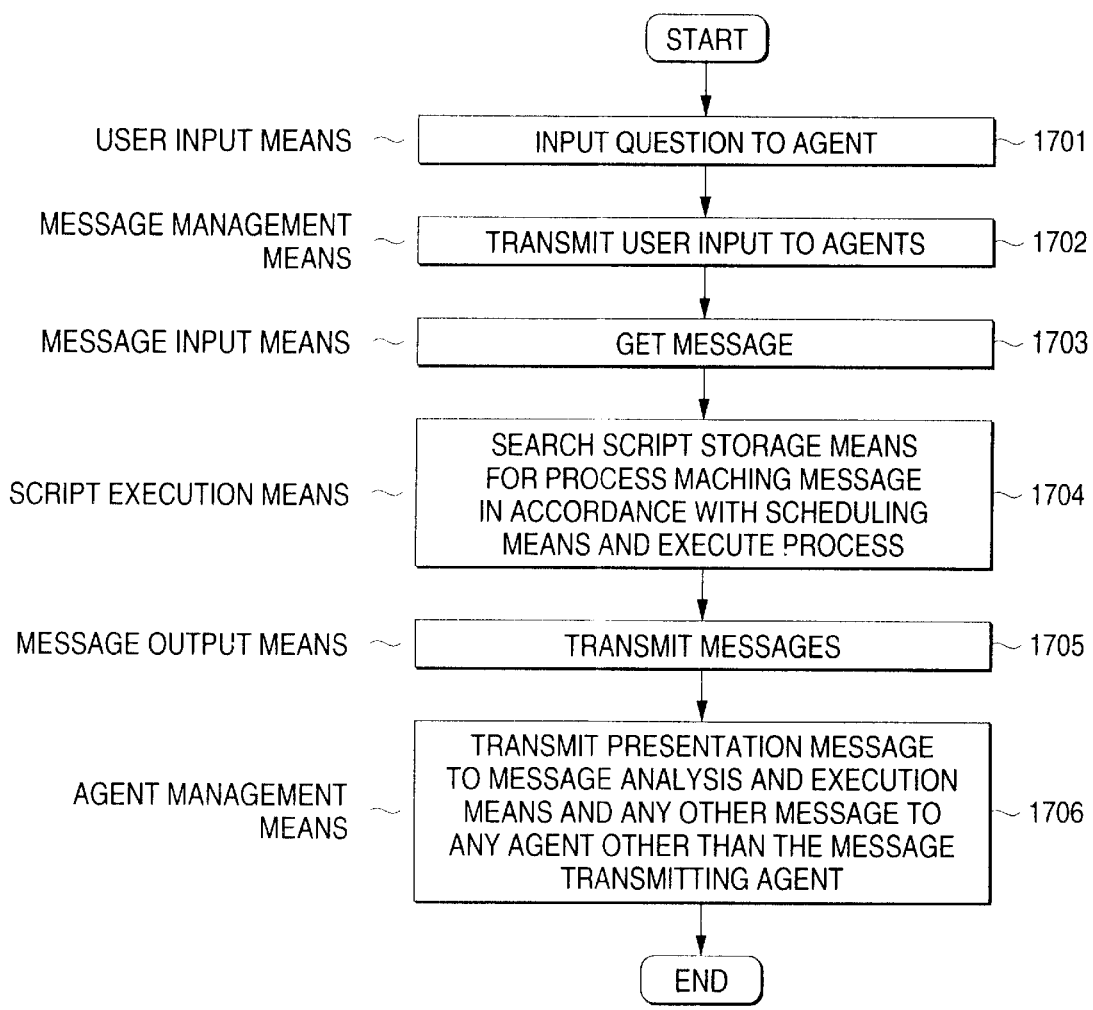
FIG. 17 is a flowchart to show the procedure of the agent in the fifth embodiment of the invention.

An operation sequence of two agents competing with each other for the commodity price and condition offered to the user will be discussed with reference to a flowchart of FIG. 17. FIG. 17 is a flowchart to show the operation procedure of the agent presentation apparatus of the fourth embodiment. The operation description to follow with reference to FIG. 17 assumes that the scripts in FIGS. 15 and 16 are stored in the script storage means of the agents.

In FIG. 17, first the user transmits a message for inquiring about the price of a commodity through the user input means 1405 at step 1701. The agent management means 14013 transmits the message to the message input means 1401 of the registered agents at step 1702. Assume that the message to agent1 is "ask (user, agent1, [\_, teach, videoA, price, \_,\_])." Pattern matching similar to that in the first embodiment is executed, agent1 displays 10000 yen from FIG. 15, and agent2 displays 12000 yen from FIG. 16 (steps 1702 to 1705). The agent management means 14013 also transmits the messages to the agents at step 1705. Since agent1 sets the price lower than the price offered by agent2 from the script in FIG. 16, agent2 offers a price at a 10% discount. If agent2 offers a price lower than the price offered by agent1, agent1 transmits a message for throwing in a commodity.

As described above, in the fourth embodiment of the invention, the agent presentation apparatus is configured as follows: Agents are registered, a message from the user is transmitted to the registered agents, a message from each agent is transmitted to the registered agent other than the message transmitting agent, and the agents compete with each other for presentation to the user while they communicate with each other. Thus, using WWW pages, images, text, and voice, the agents can compete with each other for presentation while they communicate with each other.

In the embodiment, the agents compete with each other for a price, but can also cooperate with each other about one matter.

Fifth Embodiment

A fifth embodiment of the invention provides an agent presentation apparatus wherein an agent can be transferred and can automatically communicate with the agent in the system to which that agent is transferred for exchanging information between the agents.

Figure 18:
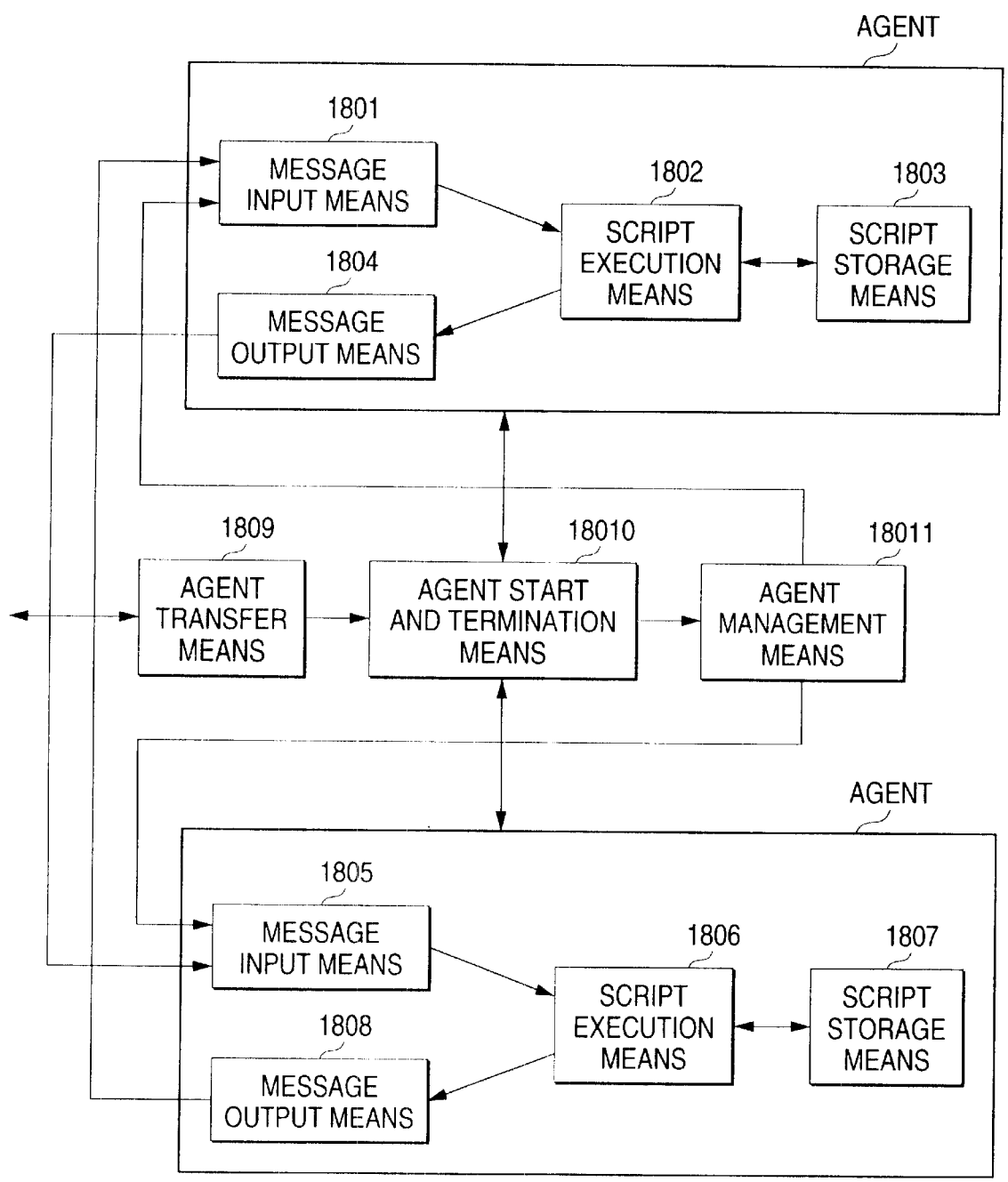
FIG. 18 is a block diagram of an agent in an agent presentation apparatus in a fifth embodiment of the invention.

FIG. 18 is a conceptual drawing to show the configuration of the agent presentation apparatus in the fifth embodiment of the invention. In the figure, message input means 1801, 1805 is means for receiving a message. Script execution means 1802, 1806 is means for finding a pattern matching script from script storage means 1803, 1807 in response to the received message and executing the found script. The script storage means 1803, 1807 is means for storing a script consisting of knowledge description and action description. Message output means 1804, 1808 is means for transmitting a message. Agent transfer means 1809 is means for transferring an agent. Agent start and termination means 18010 is means for starting the agent transferred from the agent transfer means 1809, terminating the started agent, and informing agent management means 18011 that the agent is started or terminated. The agent management means 18011 is means being responsive to information provided by the agent start and termination means 18010 for registering an agent, deleting a registered agent, and when an agent is registered, informing any other agent that that agent is registered.

The operation of the described agent presentation apparatus of the fifth embodiment of the invention is as follows: FIG. 19 is a drawing to show a script consisting of knowledge description, action description, and message description stored in the script storage means 1803. The scripts shown in FIGS. 19 and 20 are scripts for exchanging vegetable prices at known stores when the names are received from the agent management means 18011, wherein the description from "knowledge>" to "<knowledge" is the knowledge description, the description from "rule>" to "<rule" is the action description, and the description from "message>" to "<message" is the message description.

Figure 21:
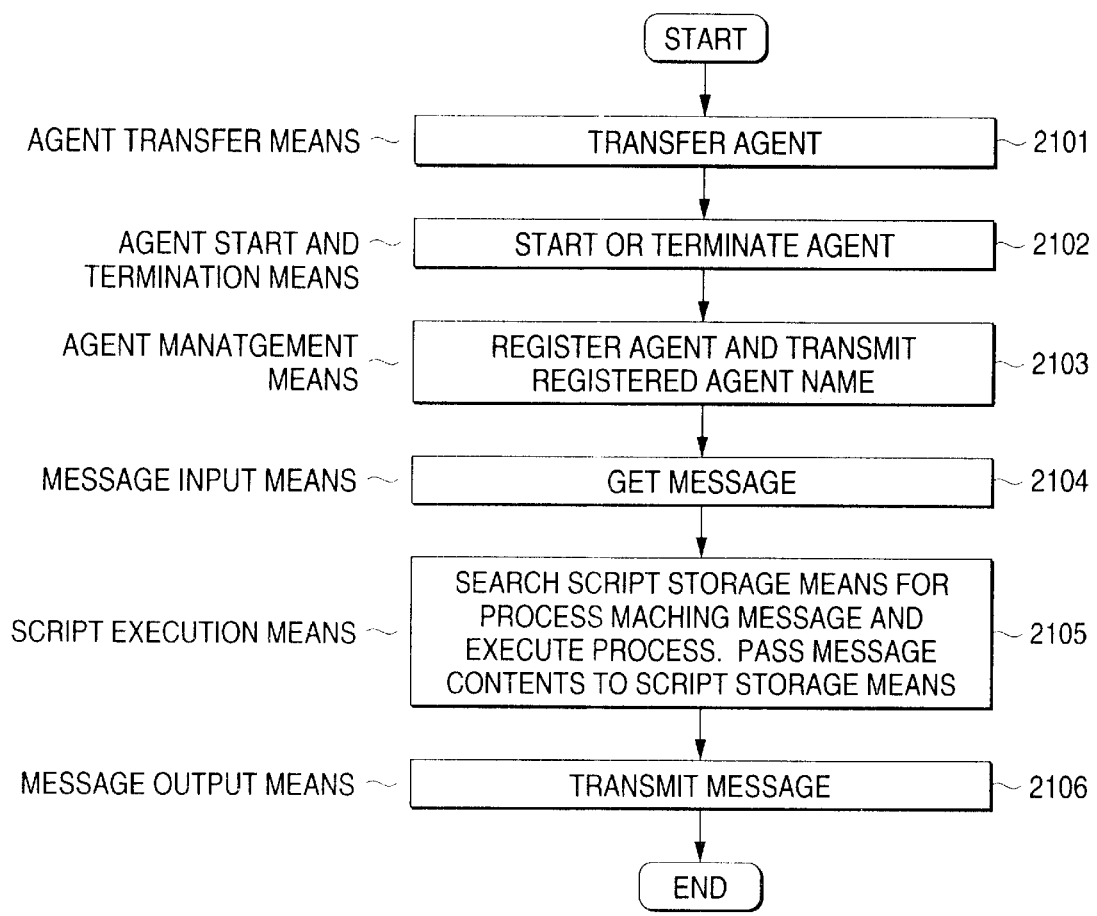
FIG. 21 is a flowchart to show the procedure of the agent in the fifth embodiment of the invention.

An operation sequence wherein a new agent is moved and automatically exchanges information with an already existing agent will be discussed with reference to a flowchart of FIG. 21. FIG. 21 is a flowchart to show the operation procedure of the agent presentation apparatus of the fifth embodiment. The operation description to follow with reference to FIG. 21 assumes that the scripts in FIGS. 19 and 20 are stored in the script storage means of the agents.

In FIG. 21, first the agent transfer means 1809 receives an agent at step 2101. The agent start and termination means 18010 starts the received agent at step 2102. The received agent is registered in the agent management means 18011 and previously registered agent name and newly received agent name are transmitted to the received agent and the already existing agent respectively as messages at step 2103. The message input means 1801 and 1805 receive the messages at step 2104. The message to agent1 is "tell (user, agent1, [__, names, are,__, agent2,__])" and the message to agent2 is "tell (user, agent1, __, names, are, __, agent1,__])."

First, agent1 will be discussed with reference to FIG. 19. Upon reception of the message "tell (user, agent1, [__, names, are, __, agent2,__])" agent1 transmits a message of "ask (agent1, agent2, [__, teach, your, info, __, __]) to another agent "agent2" from pattern matching similar to that in the first embodiment. Upon reception of the message, agent2 returns information of "tomato," "kyuri," and "nasu," of "storeB" in the knowledge description. If a reference is made to the knowledge description with a variable of "Object," generally only the information of "tomato" in the first description is obtained, however, here, matching is executed for all information with the variable with an instruction of know_all at step 2106. The operation can also be performed from agent2 to agent1 for exchanging information therebetween.

As described above, in the fifth embodiment of the invention, the agent presentation apparatus is configured as follows: An agent is transferred and automatically communicates with the agent in the system to which that agent is transferred for exchanging information between the agents. Thus, an agent can be sent to a target system for getting necessary information.

Sixth Embodiment

A sixth embodiment of the invention provides an agent presentation apparatus wherein an agent transmits a message for calling another agent and the called agent is started in the location in which the calling agent exists.

Figure 22:
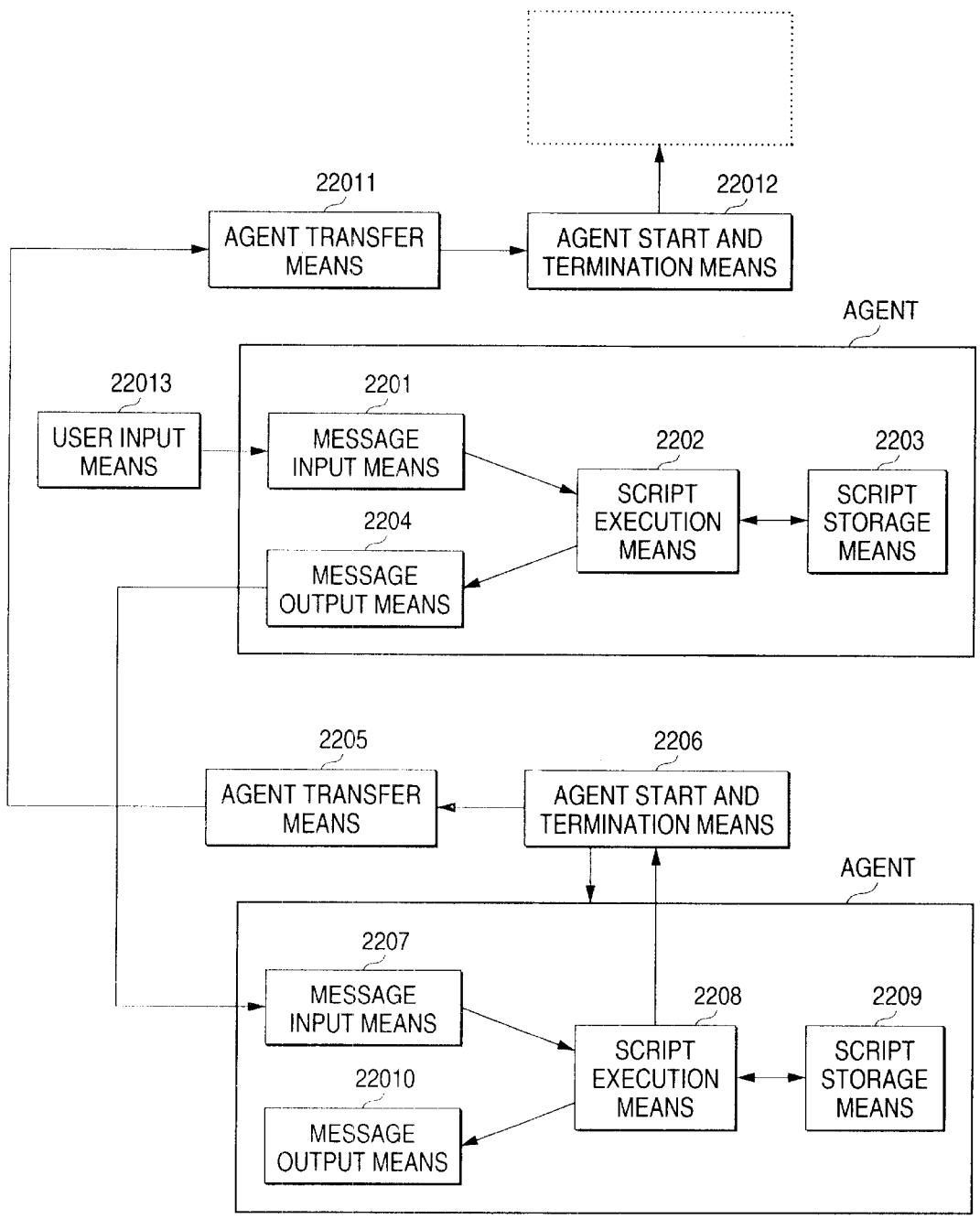
FIG. 22 is a block diagram of an agent in an agent presentation apparatus in a sixth embodiment of the invention.

FIG. 22 is a conceptual drawing to show the configuration of the agent presentation apparatus in the sixth embodiment of the invention. In the figure, message input means 2201, 2207 is means for receiving a message. Script execution means 2202, 2208 is means for finding a pattern matching script from script storage means 2203, 2209 in response to the received message and executing the found script. The script storage means 2203, 2209 is means for storing a script consisting of knowledge description and action description. Message output means 2204, 22010 is means for transmitting a message. Agent transfer means 2205, 22011 is means for transferring an agent. Agent start and termination means 2206, 22012 is means for starting the agent transferred from the agent transfer means and terminating the started agent. User input means 22013 is means for transmitting a message from the user to the agent.

The operation of the described agent presentation apparatus of the sixth embodiment of the invention is as follows: FIG. 23 is a drawing to show a script consisting of knowledge description, action description, and message description stored in the script storage means 2203. The scripts shown in FIGS. 23 and 24 are scripts for one agent to call another agent related to that agent, wherein the description from "knowledge>" to "<knowledge" is the knowledge description, the description from "rule>" to "<rule" is the action description, and the description from "message>" to "<message" is the message description.

Figure 25:
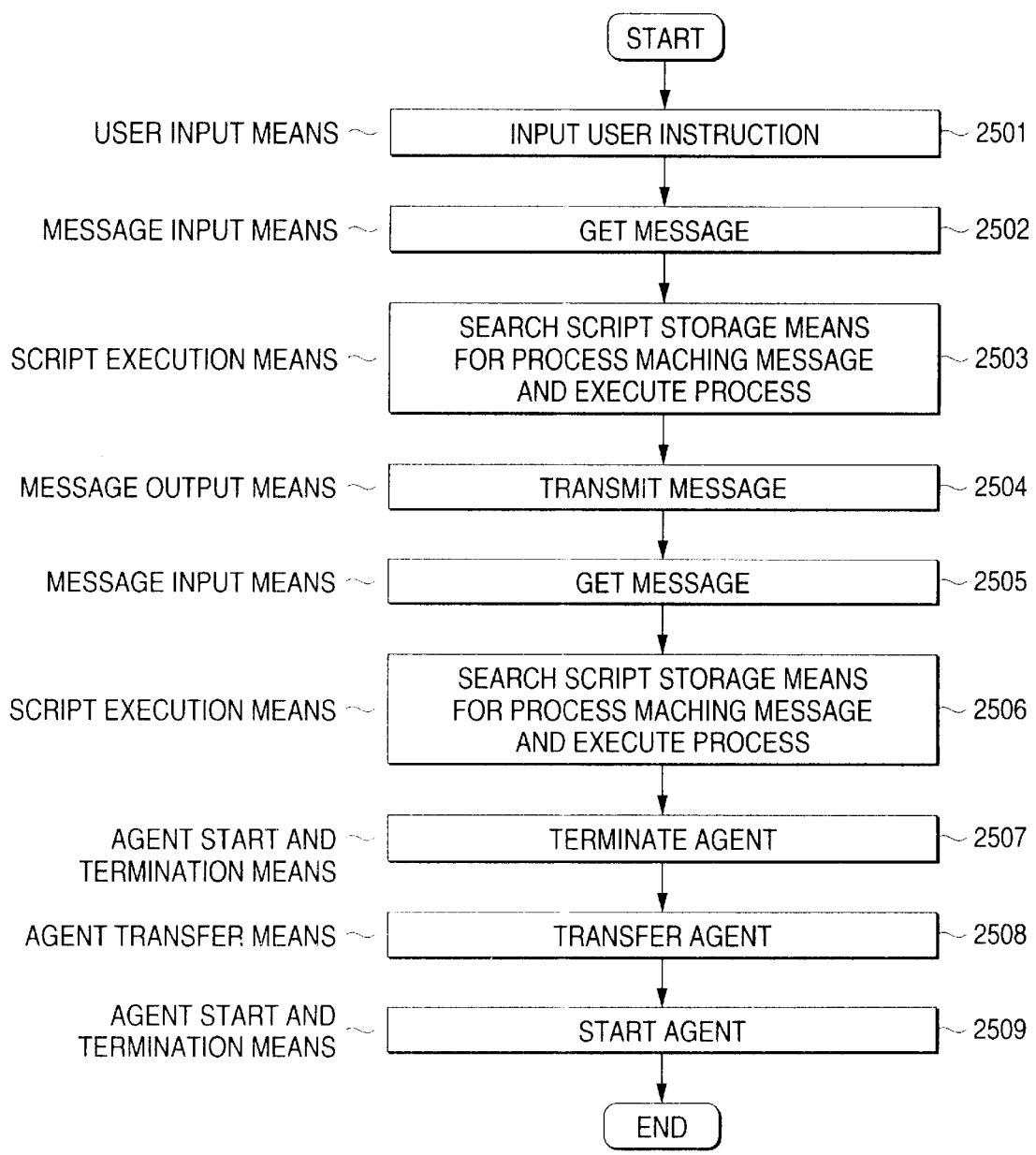
FIG. 25 is a flowchart to show the procedure of the agent in the sixth embodiment of the invention.

An operation sequence wherein one agent calls another agent related to that agent will be discussed with reference to a flowchart of FIG. 25. FIG. 25 is a flowchart to show the operation procedure of the agent presentation apparatus of the sixth embodiment. The operation description to follow with reference to FIG. 25 assumes that the scripts in FIGS. 23 and 24 are stored in the script storage means of the agents.

In FIG. 25, first the message input means 2201 gets a message of "ask (user, agent1, [__, explain, your, product, __, placeA])" from the user input means 22013 at steps 2501 and 2502. Pattern matching similar to that in the first embodiment and the script execution means 2202 of tv_agent finds action ([__,explain, your, product, __, placeA]), . . . ) in the action description from the script in FIG. 23. Here, "This is new TV" or the like is displayed, from the next description "info(relation-agent . . . ," a reference is made to the knowledge description, and "video_agent" is obtained as variable "RelationAgent" as the related agent. The message "ask(user,agent1,[__,explain, your, product, __, placeA))" is sent to the agent at steps 2503 and 2504. The agent "video_agent" having the script in FIG. 24 receives the message at the message input means 2207 at step 2505. Here, action ([__, explain, your, product, __, OtherPlaceA]) , . . . ) in the action description is found from similar pattern matching. Based on the next description "go(OtherPlace)," the script execution means 2208 requests the agent start and termination means 2206 to terminate and transfer the agent at steps 2506 and 2507. The position of the description is held.

The agent start and termination means 2206 causes the agent transfer means 2205 to the agent at step 2508. The agent transfer means 22011 receives the agent and the agent start and termination means 22012 starts the agent at step 2509. Then, the script execution means 2208 restarts processing at the previously held script position and a presentation of "This is good video for the TV" or the like is made. After this, similar operation is repeated until the introducing agent exits.

As described above, in the sixth embodiment of the invention, the agent presentation apparatus is configured as follows: An agent transmits a message for calling another agent and the called agent is started in the location in which the calling agent exists. Thus, an agent can call another agent related to that agent and related products to a commodity can be introduced, for example.

Seventh Embodiment

A seventh embodiment of the invention provides an agent presentation apparatus wherein if the user enters a keyword for searching for any desired agent; a search is made for the corresponding agent according to the keyword and a message calling the found agent is transmitted.

Figure 26:
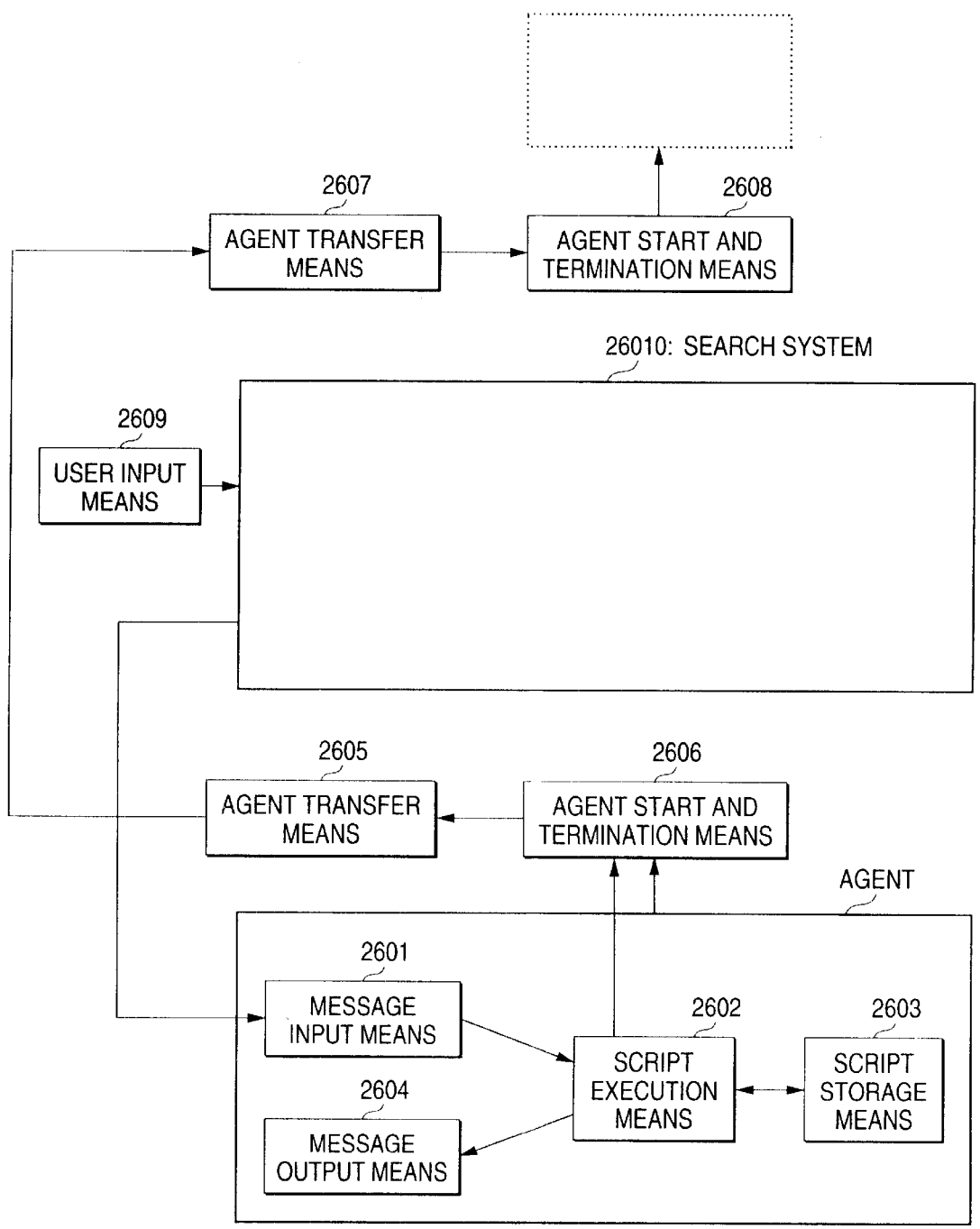
FIG. 26 is a block diagram of an agent in an agent presentation apparatus in a seventh embodiment of the invention.

FIG. 26 is a conceptual drawing to show the configuration of the agent presentation apparatus in the seventh embodiment of the invention. In the figure, message input means 2601 is means for receiving a message. Script execution means 2602 is means for finding a pattern matching script from script storage means 2603 in response to the received message and executing the found script. The script storage means 2603 is means for storing a script consisting of knowledge description and action description. Message output means 2604 is means for transmitting a message. Agent transfer means 2605, 2607 is means for transferring an agent. Agent start and termination means 2606, 2608 is means for starting the agent transferred from the agent transfer means and terminating the started agent. User input means 2609 is means for transmitting a message from the user to the agent. A search system 26010 searches for a related agent based on the search keyword entered by the user and sends a message for calling the found agent to the agent.

The operation of the described agent presentation apparatus of the seventh embodiment of the invention is as follows: FIG. 27 is a drawing to show a script consisting of knowledge description, action description, and message description stored in the script storage means 2603. The script shown in FIG. 27 is a script for moving an agent to a specified location in response to a calling message, wherein the description from "knowledge>" to "<knowledge" is the knowledge description, the description from "rule>" to "<rule" is the action description, and the description from "message>" to "<message" is the message description. An operation sequence wherein the user searches for an agent and calls the agent will be discussed with reference to a flowchart of FIG. 28.

Figure 28:
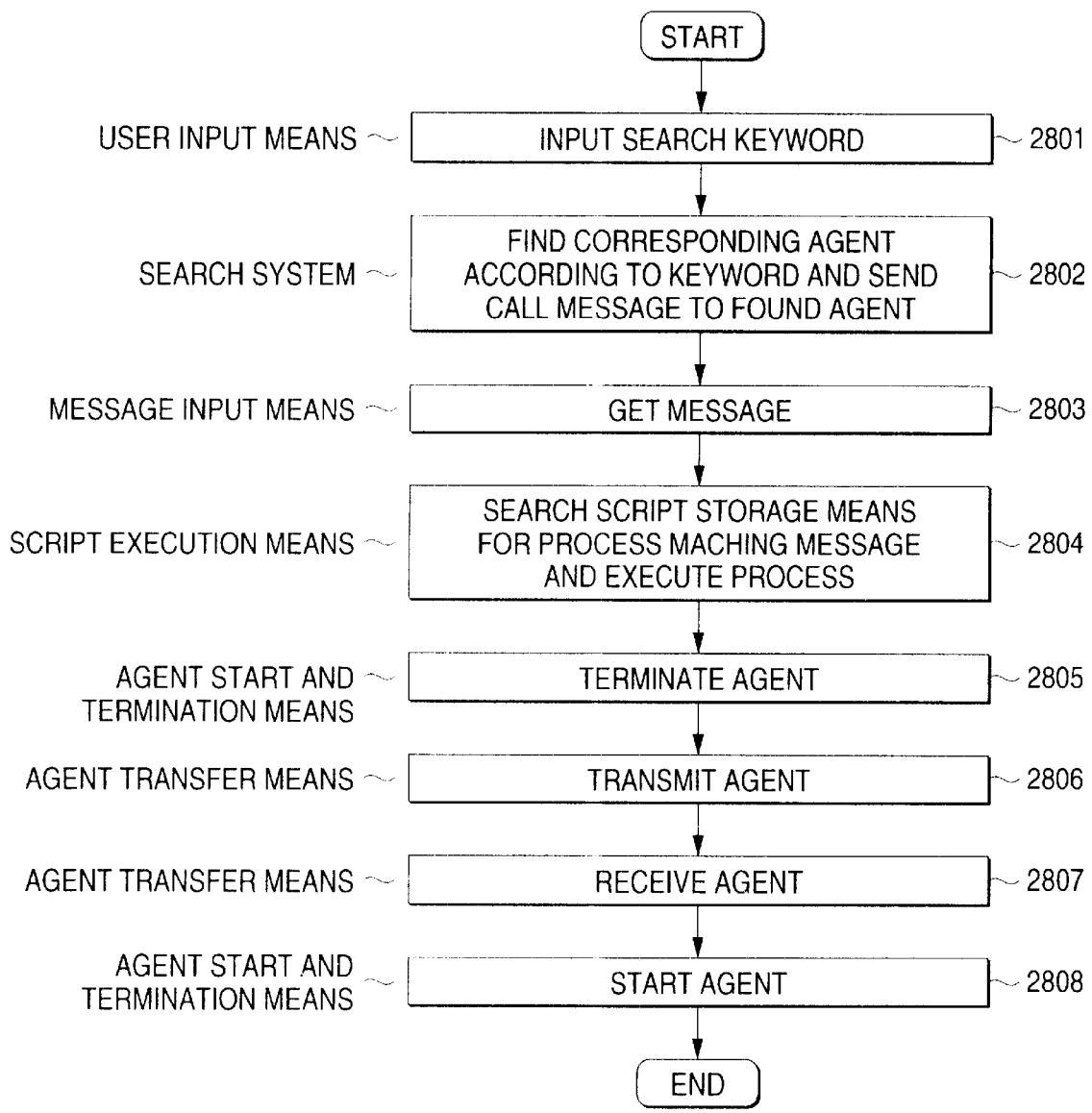
FIG. 28 is a flowchart to show the procedure of the agent in the seventh embodiment of the invention.

FIG. 28 is a flowchart to show the operation procedure of the agent presentation apparatus of the seventh embodiment. The operation description to follow with reference to FIG. 28 assumes that the script in FIG. 27 is stored in the script storage means of the agent.

In FIG. 28, first a keyword of "TV" and the location of the user, for example, "placeA" are entered through the user input means 2609 at step 2801. The search system 26010 searches for agent name "tv_agent" from the keyword, prepares an agent calling message containing the agent name and the location name, and transmits the message to the message input means 2601 of "tv_agent" at step 2802. After this, the agent is transferred to the user according to a similar procedure to that in the sixth embodiment at steps 2803 to 2808. A script for making a presentation is not shown in the script in FIG. 27, but is similar to that shown above.

As described above, in the seventh embodiment of the invention, the agent presentation apparatus is configured as follows: If the user enters a keyword for searching for any desired agent, a search is made for the corresponding agent according to the keyword and a message calling the found agent is transmitted. Thus, the user can search for an agent and calls the found agent for making a presentation, etc.

Eighth Embodiment

An eighth embodiment of the invention provides an agent presentation apparatus wherein the user selects an agent out of a WWW browser, prepares a message for calling the agent through a WWW server, calls the agent, and makes a presentation.

Figure 29:
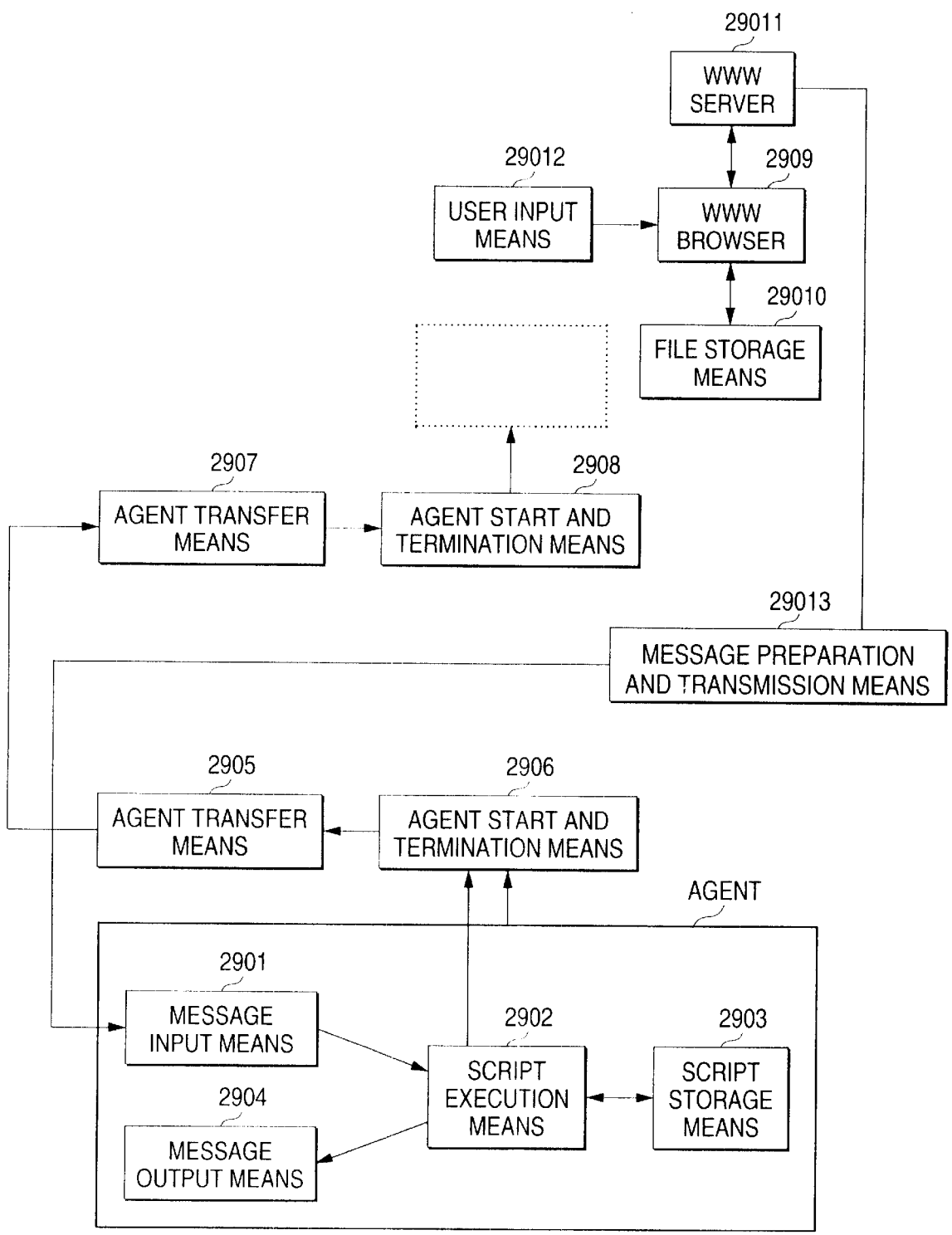
FIG. 29 is a block diagram of an agent in an agent presentation apparatus in an eighth embodiment of the invention.

FIG. 29 is a conceptual drawing to show the configuration of the agent presentation apparatus in the eighth embodiment of the invention. In the figure, message input means 2901 is means for receiving a message. Script execution means 2902 is means for finding a pattern matching script from script storage means 2903 in response to the received message and executing the found script. The script storage means 2903 is means for storing a script consisting of knowledge description and action description. Message output means 2904 is means for transmitting a message. Agent transfer means 2905, 2907 is means for transferring an agent. Agent start and termination means 2906, 2908 is means for starting the agent transferred from the agent transfer means and terminating the started agent. A WWW browser 2909 is means for displaying a WWW page. File storage means 29010 is means for storing a file used with the WWW browser. A WWW server 29011 is means for transferring a WWW page on a network based on an instruction from the WWW browser 2909 and executing a program. User input means 29012 is means for transmitting a message from the user to the agent. The user input means 29012, the WWW browser 2909, the file storage means 29010, the WWW server 29011, message preparation and transmission means 29013, and the agent make up means for executing user input from the WWW browser.

The operation of the described agent presentation apparatus of the eighth embodiment of the invention is as follows: FIG. 30 is a drawing to show a script consisting of knowledge description, action description, and message description stored in the script storage means 2903. The script shown in FIG. 30 is a script for moving an agent to a specified location in response to a calling message from the WWW browser, wherein the description from "knowledge>" to "<knowledge" is the knowledge description, the description from "rule>" to "<rule" is the action description, and the description from "message>" to "<message" is the message description. An operation sequence wherein the user searches for an agent and calls the agent will be discussed with reference to a flowchart of FIG. 28.

Figure 31:
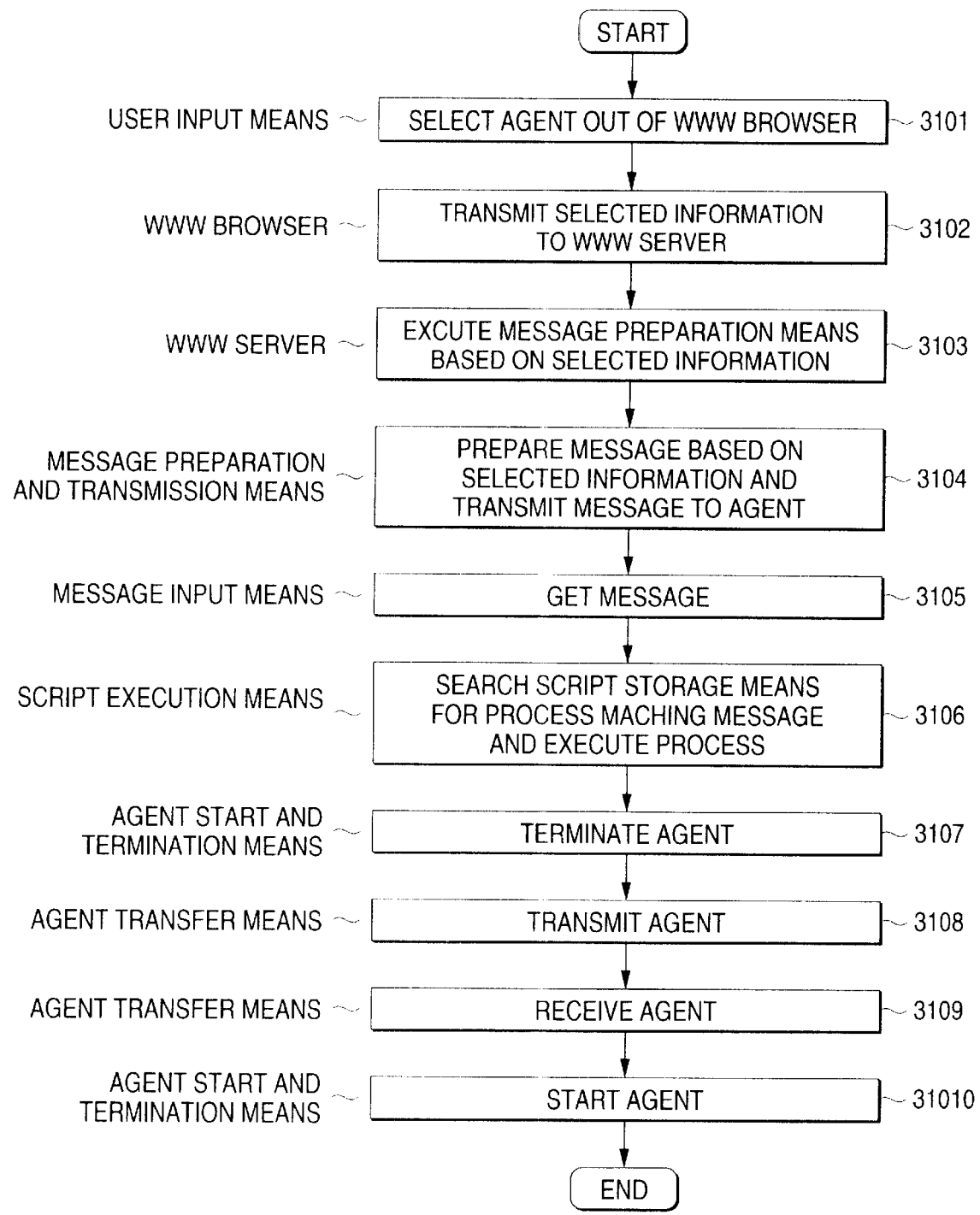
FIG. 31 is a flowchart to show the procedure of the agent in the eighth embodiment of the invention.
Figure 32:
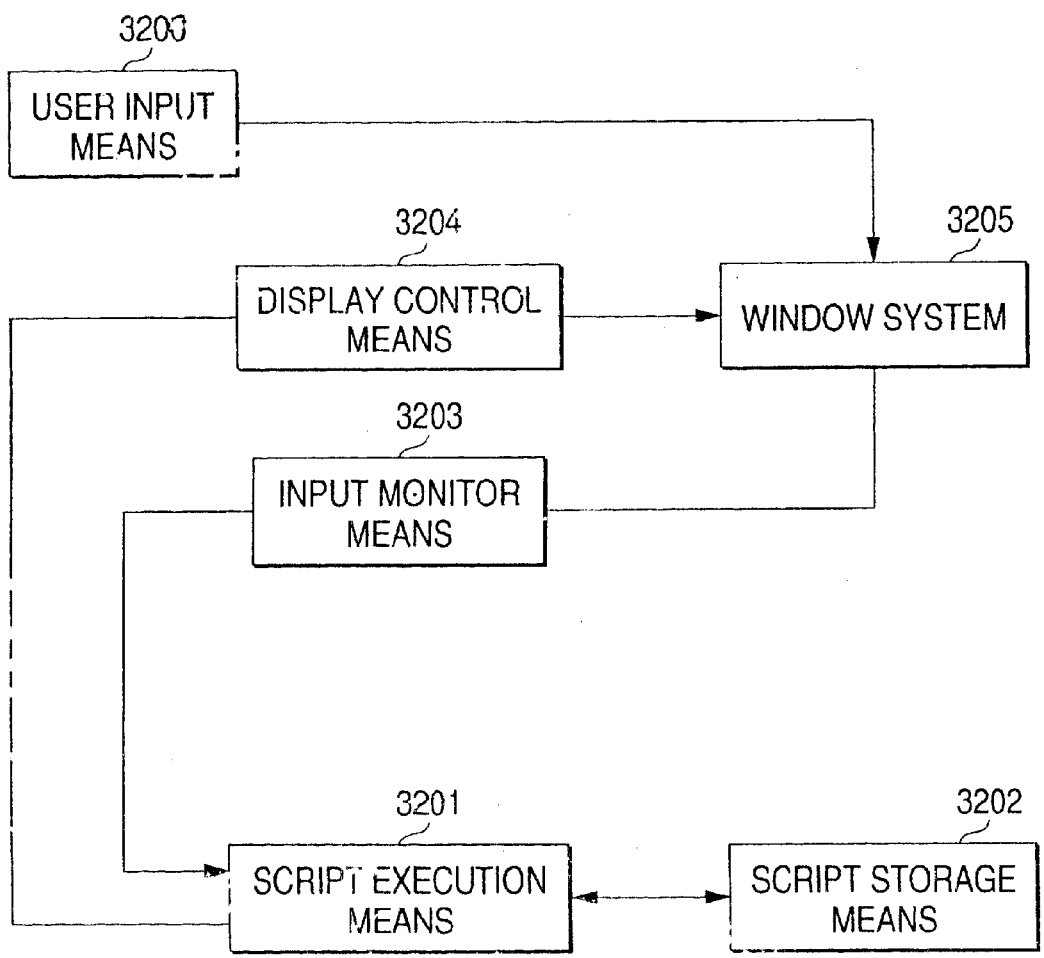
FIG. 32 is a block diagram to show the configuration of an expert system in a related art.
Figure 33:
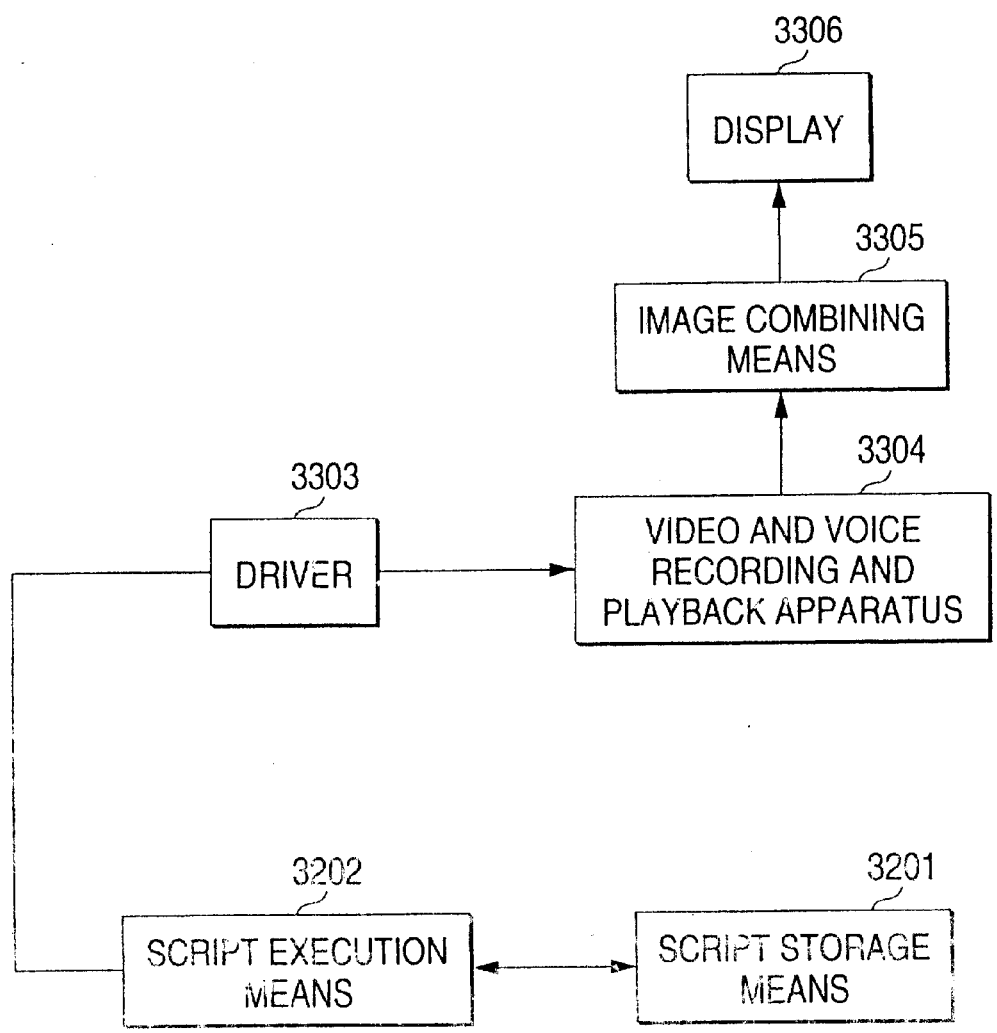
FIG. 33 is a block diagram to show the configuration of an expert system in a related art.

FIG. 31 is a flowchart to show the operation procedure of the agent presentation apparatus of the eighth embodiment. The operation description to follow with reference to FIG. 31 assumes that the script in FIG. 30 is stored in the script storage means of the agent.

In FIG. 31, first one link is selected out of the WWW browser 2909 through the user input means 29012 at step 3101. The WWW browser 2902 transmits selected link information "tv_agent" to the WWW server 29011 at step 3102. The WWW server 29011 executes the message preparation and transmission means 29013 based on the selected information. The message preparation and transmission means 29013 sends a message of "ask (user, tv_agent, [_, explain, your, product,_, placeA])" to the message input means 2901 at step 3104. After this, similar operation to that in the seventh embodiment is performed at steps 3105 to 31010. A script for making a presentation is not shown in the script in FIG. 30, but is similar to that shown above.

As described above, in the eighth embodiment of the invention, the agent presentation apparatus is configured as follows: The user selects an agent out of the WWW browser, prepares a message for calling the agent through the WWW server, calls the agent, and makes a presentation. Thus, the user can call any agent from the WWW browser for making a presentation.

As seen from the description made so far, the agent presentation apparatus of the invention comprises user input means for inputting a user message, an agent for processing the user message and outputting a presentation message, message analysis and execution means for analyzing the presentation message and generating an output instruction, image output means for outputting an image in accordance with the output instruction, text output means for outputting text in accordance with the output instruction, voice output means for outputting a voice in accordance with the output instruction, a WWW browser for displaying a WWW page in accordance with the output instruction, file storage means for storing files of the output means, and a WWW server for getting a WWW page and executing a command according to an instruction from the WWW browser, wherein the agent comprises message input means for receiving the user message, script storage means for storing a script consisting of knowledge description and action description, script execution means for executing the script based on description selected by executing pattern matching between the user message and the script, and message output means for transmitting a presentation message from the script execution means. As described above, in the invention, the agent can get a WWW page locally or from the network as already existing contents and make a presentation using the WWW page. A reply to a question about the WWW page can also be made using the knowledge description and action description. If a reply to a question cannot be made in the current action description and knowledge description, a relevant WWW page is displayed for requesting the user to make a determination, whereby the WWW page can be used to make a reply to the same question later.

The agent presentation apparatus further includes scheduling means for transmitting and receiving a message to and from the user input means and the script execution for managing a presentation schedule, presentation script and file transmission means for transmitting a presentation script and a file, file and script reception means for receiving a file and a presentation script from the presentation script and file transmission means, storing the file and the presentation script in the file storage means and the script storage means, and generating a reception notification signal, and agent start means for staring the agent if the reception notification signal is received and it is determined that necessary script and file have been received. Thus, the agent can make a presentation in accordance with the specified time or the schedule.

The agent presentation apparatus further includes an agent for receiving a search message, converting the search message into a message for making a request for searching www pages, and transmitting a URL of the search result as a message to the agent sending the search message and a search server for searching WWW pages and returning a page containing the URL of the corresponding page. Thus, messages are transmitted and received and in response to a search request from the user or any other agent, communication can be executed with the agent dedicated to each search server, the target search result can be gotten as a URL, and the search result page can be displayed directly on the WWW browser.

The agent presentation apparatus further includes agent management means for registering agents, transmitting a message from the user input means to the registered agents, and transmitting a message transmitted from each agent to the registered agent other than the message transmitting agent. Thus, one agent can be made to compete with another agent for presentation using a WWW page, an image, text, and voice while they communicate with each other.

The agent presentation apparatus further includes agent transfer means for transferring an agent, agent start and termination means for starting and terminating the transferred agent, and agent management means for registering and deleting an agent in response to notification from the agent start and termination means and when an agent is registered, for transmitting a previously registered agent name to the newly registered agent and the newly registered agent name to the previously registered agent. Thus, an agent can be transmitted to another machine where another agent exists so that the agent can automatically communicate with the agent in the machine for exchanging information therebetween.

The agent presentation apparatus further includes an agent for transmitting a call message, agent transfer means for transferring a called agent to the location of the calling agent, and agent start and termination means for starting the called agent. Thus, an agent can call another agent related to that agent and related products to a commodity can be introduced, for example.

The agent presentation apparatus further includes user input means for inputting a keyword for searching for the user-desired agent and a search system for searching for the corresponding agent according to the keyword and transmitting a message for calling the corresponding agent. Thus, the user can search for an agent and calls the found agent for making a presentation.

The agent presentation apparatus further includes message preparation means for preparing a message for selecting an agent out of the WWW browser and calling the agent through the WWW server. Thus, the user can call any agent from the WWW browser for making a presentation.

What is claimed is:

1. An agent presentation apparatus comprising:

user input means for inputting a user message;

an agent for processing the user message and outputting a presentation message;

message analysis and execution means for analyzing the presentation message and for generating an output instruction; image output means for outputting an image in accordance with the output instruction;

text output means for outputting text in accordance with the output instruction; voice output means for outputting a voice in accordance with the output instruction;

a WWW browser for displaying a WWW page in accordance with the output instruction;

file storage means for storing files of said output means; and a WWW server for getting a WWW page and executing a command according to an instruction from said WWW browser, wherein said agent comprises:
message input means for receiving the user message; script storage means for storing a script having a knowledge description and an action description; script execution means for executing the script based on description selected by executing pattern matching between the user message and the script; and
message output means for transmitting a presentation message from the script execution means to one or both of the WWW search message presentation means and the message analysis and execution means.

2. The agent presentation apparatus as claimed in claim 1 further including:

scheduling means for transmitting and receiving a message to and from the script execution means through said user input means, the message input means, and the message output means for managing a presentation schedule;

presentation script and file transmission means for transmitting a presentation script and a file;

file and script reception means for receiving a file and a presentation script from the presentation script and file transmission means, storing the file and the presentation script in the file storage means and the script storage means, and generating a reception notification signal; and agent start means for staring said agent if the reception notification signal is received and it is determined that necessary script and file have been-received.

3. The agent presentation apparatus as claimed in claim 1 further including:

an agent for receiving a search message, converting the search message into a message for making a request for searching WWW pages, and transmitting a URL of the search result as a message to the agent sending the search message; and a search server for searching WWW pages and returning a page containing the URL of the corresponding page.

4. The agent presentation apparatus as claimed in claim 1 further including agent management means for registering agents, transmitting a message from said user input means to the registered agents, and transmitting a message transmitted from each agent to the registered agent other than the message transmitting agent.

5. The agent presentation apparatus as claimed in claim 1 further including:

agent transfer means for transferring an agent, agent start and termination means for starting and terminating the transferred agent; and agent management means for registering and deleting an agent in response to notification from the agent start and termination means and when an agent is registered, for transmitting a previously registered agent name to the newly registered agent and the newly registered agent name to the previously registered agent.

6. The agent presentation apparatus as claimed in claim 5 further including an agent for transmitting a call message, agent transfer means for transferring a called agent to the location of the calling agent, and agent start and termination means for starting the called agent.

7. The agent presentation apparatus as claimed in claim 6 further including user input means for inputting a keyword for searching for a user-desired agent and a search system for searching for the corresponding agent according to the keyword and transmitting a message for calling the corresponding agent.

8. The agent presentation apparatus as claimed in claim 7 further including message preparation means for preparing a message for selecting an agent out of the WWW browser and calling the agent through the WWW server.

9. An agent presentation method comprising the steps of:

executing pattern matching between a user message entered by a user and a script held in an agent, the script having a corresponding description;

selecting and executing the corresponding description, and outputting a presentation message;

analyzing the presentation message;

generating an output instruction;

outputting an image, text, or a voice in accordance with the output instruction;

requesting and displaying a WWW page from a WWW server or a file system;

driving a WWW browser; and making a presentation to the user based on user input from the WWW browser.

10. The agent presentation method as claimed in claim 9 further comprising the steps of:

receiving and storing a file required for presentation;

starting the agent if the agent receives a script required for presentation;

managing a presentation schedule in accordance with a user message and a message from the agent; and making a presentation to the user in accordance with specified time or schedule.

11. The agent presentation method as claimed in claim 9, wherein the agent receives a search request message from a user or any other agent, communicates with an agent dedicated to a search server, gets the target search result as a URL, and displays the search result page directly on the WWW browser.

12. The agent presentation method as claimed in claim 9 wherein agents are registered, a message from the user is transmitted to the registered agents, a message transmitted from each agent is transmitted to the registered agent other than the message transmitting agent, and the agents compete with each other for presentation to the user while they communicate with each other.

13. The agent presentation method as claimed in claim 9 wherein an agent is transferred, when the transferred agent is registered, a previously registered agent name is transmitted to the transferred agent and the newly registered agent name is transmitted to the previously registered agent, and the transferred agent automatically communicates with the previously registered agent for exchanging information therebetween.

14. The agent presentation method as claimed in claim 13 wherein an agent calls another agent and starts the agent.

15. The agent presentation method as claimed in claim 14 wherein a search is made for an agent and the found agent is called to the user.

16. The agent presentation method as claimed in claim 15 wherein a message for selecting an agent out of the WWW browser and calling the agent through the WWW server is prepared and the agent is called.

\* \* \* \* \*

UNITED STATES PATENT AND TRADEMARK OFFICE
CERTIFICATE OF CORRECTION

PATENT NO. : 6,581,051 B1  Page 1 of 1
DATED : June 17, 2003
INVENTOR(S) : Tsuyoshi Ueno et al.

It is certified that error appears in the above-identified patent and that said Letters Patent is hereby corrected as shown below:

<u>Title page,</u>
Item [56], References Cited, FOREIGN PATENT DOCUMENTS, please delete
"JP    6-51935    2/1999", and insert therefor -- JP    6-51935    2/1994 --.

<u>Column 19,</u>
Line 16, please delete "staring", and insert therefor -- starting --.
Line 18, please delete "been-received", and insert therefor -- been received --.

Signed and Sealed this

Thirtieth Day of December, 2003

JAMES E. ROGAN
*Director of the United States Patent and Trademark Office*